(12) United States Patent
Miyazaki

(10) Patent No.: US 11,675,558 B1
(45) Date of Patent: Jun. 13, 2023

(54) IMAGE FORMING APPARATUS AND METHOD WHICH PERFORMS PRINTING ACCORDING TO AN ELECTROPHOTOGRAPHIC SCHEME

(71) Applicant: Toshiba Tec Kabushiki Kaisha, Tokyo (JP)

(72) Inventor: Yasunari Miyazaki, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/698,198

(22) Filed: Mar. 18, 2022

(51) Int. Cl.
*G06F 3/12* (2006.01)
*G03G 15/00* (2006.01)

(52) U.S. Cl.
CPC .......... *G06F 3/1273* (2013.01); *G03G 15/50* (2013.01); *G06F 3/121* (2013.01); *G06F 3/1203* (2013.01); *G06F 3/1229* (2013.01); *G06F 3/1259* (2013.01); *G06F 3/1285* (2013.01)

(58) Field of Classification Search
None
See application file for complete search history.

(56) References Cited

U.S. PATENT DOCUMENTS

| | | | | |
|---|---|---|---|---|
| 2017/0123358 A1* | 5/2017 | Sato | .................... | G03G 21/0094 |
| 2018/0239274 A1* | 8/2018 | Motohashi | ......... | G03G 21/0094 |
| 2020/0376866 A1 | 12/2020 | Tamai et al. | | |
| 2022/0011702 A1* | 1/2022 | Saito | .................. | G03G 21/0011 |
| 2022/0155723 A1* | 5/2022 | Mori | .................. | G03G 21/1864 |

FOREIGN PATENT DOCUMENTS

| | | |
|---|---|---|
| JP | 2007-232837 A | 9/2007 |
| JP | 2015-011159 A | 1/2015 |

* cited by examiner

*Primary Examiner* — Henok Shiferaw
(74) *Attorney, Agent, or Firm* — Foley & Lardner LLP

(57) ABSTRACT

An image forming apparatus includes an electrophotographic process assembly, a processor, and a memory. The electrophotographic process assembly is configured to transfer a toner image formed on a photoconductive body rotating around an axis extending in a main scanning direction onto a sheet conveyed in a sub-scanning direction orthogonal to the main scanning direction. The processor and memory are configured to store a print amount in a plurality of divided sections corresponding to the main scanning direction, acquire the print amount from a monitoring section in one or more monitoring target groupings corresponding to a predetermined section included in the plurality of divided sections, calculate an integrated print amount in the monitoring section, and output information relating to the monitoring target grouping corresponding to the integrated print amount in the monitoring section.

19 Claims, 18 Drawing Sheets

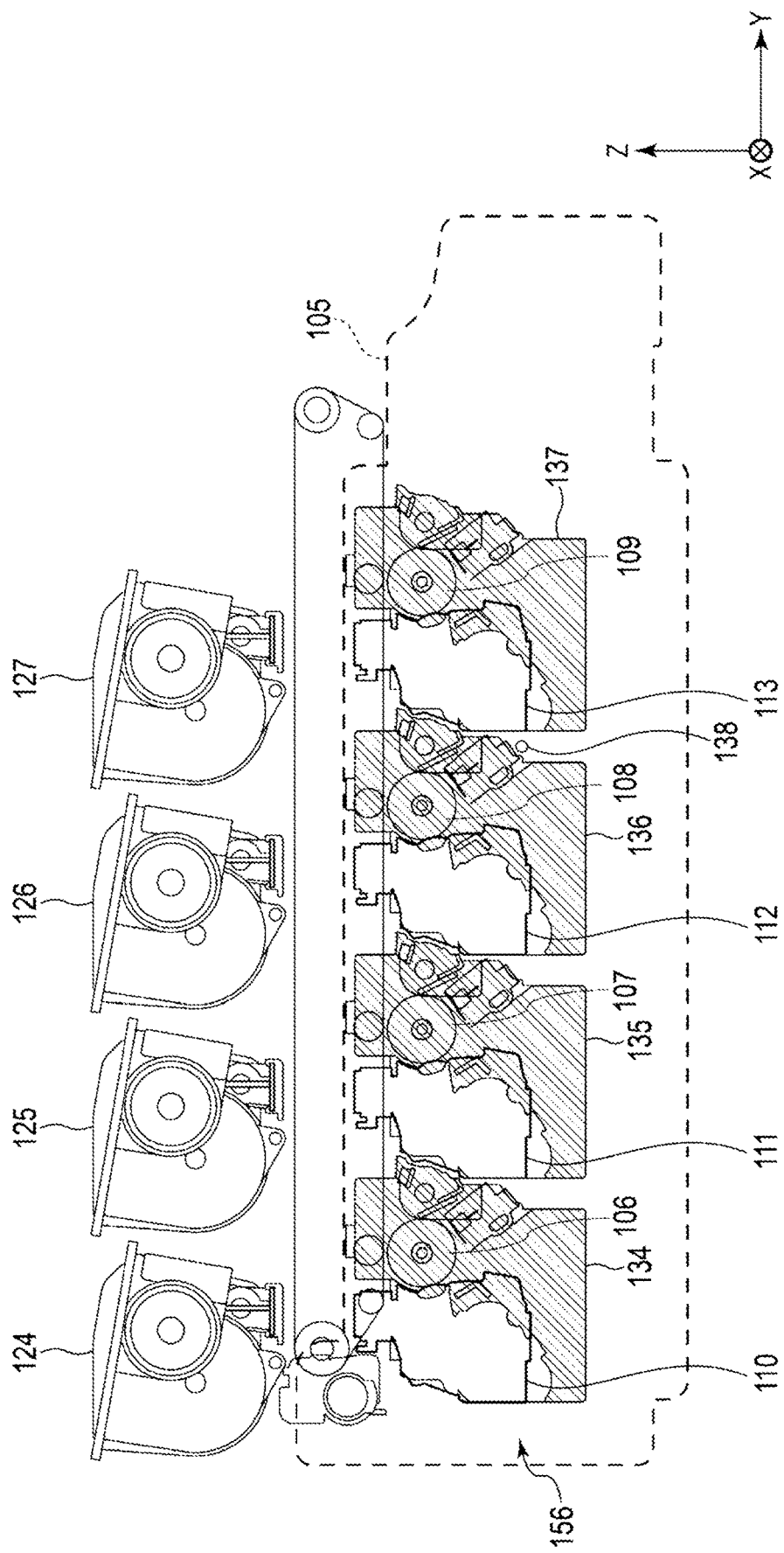

IMAGE FORMING APPARATUS AND METHOD WHICH PERFORMS PRINTING ACCORDING TO AN ELECTROPHOTOGRAPHIC SCHEME

FIELD

Embodiments described herein relate to an image forming apparatus.

BACKGROUND

Cleaning of components inside an image forming apparatus is often performed simultaneously with replacement of expendables or maintenance of a machine body. Cleaning of the inside of the image forming apparatus sometimes causes quality deterioration unless the cleaning is performed at appropriate timing.

DESCRIPTION OF THE DRAWINGS

FIG. 2 is a schematic cross-sectional view of an electrophotographic process unit as seen in FIG. 1A;

DETAILED DESCRIPTION

Referring to the figures generally, according to an exemplary, non-limiting embodiment, an image forming apparatus includes an electrophotographic process assembly; and a processor and a memory. The electrophotographic process assembly is configured to transfer a toner image formed on a photoconductive body rotating around an axis extending in a main scanning direction onto a sheet conveyed in a sub-scanning direction orthogonal to the main scanning direction. The processor and memory are configured to store a print amount in a plurality of divided sections corresponding to the main scanning direction, acquire the print amount from a monitoring section in one or more monitoring target groupings corresponding to a predetermined section included in the plurality of divided sections, calculate an integrated print amount in the monitoring section, and output information relating to the monitoring target grouping corresponding to the integrated print amount in the monitoring section.

An image forming apparatus according to exemplary, non-limiting embodiments is explained below with reference to the drawings. In the figures referred to in the following explanation of the embodiments, scales of sections are changed as appropriate. In the figures referred to in the following explanation of the embodiments, components are omitted as appropriate for explanation.

[First Embodiment]

Figure 1A:
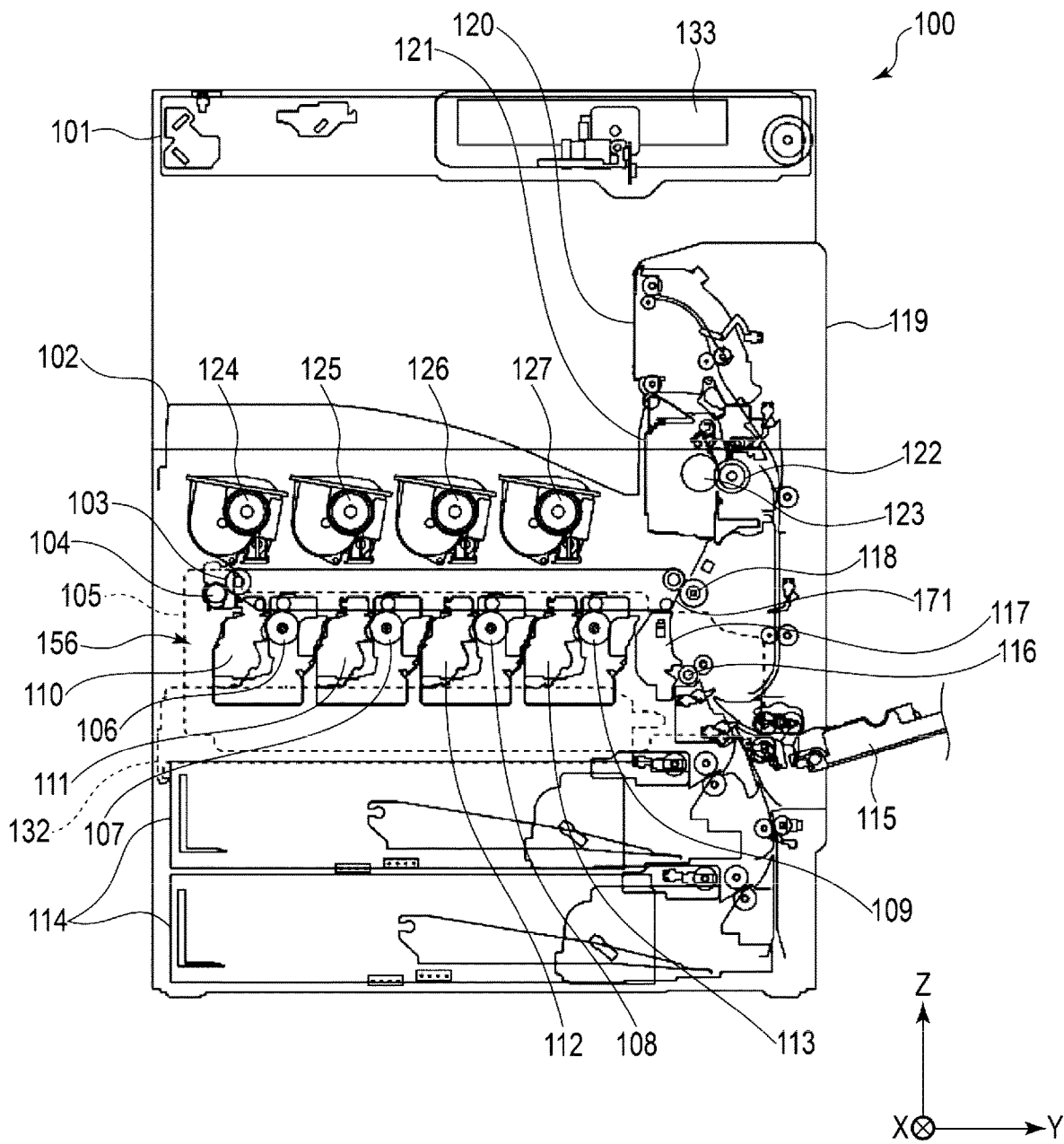
FIG. 1A is a schematic cross-sectional view of an image forming apparatus, according to exemplary embodiments.
Figure 1B:
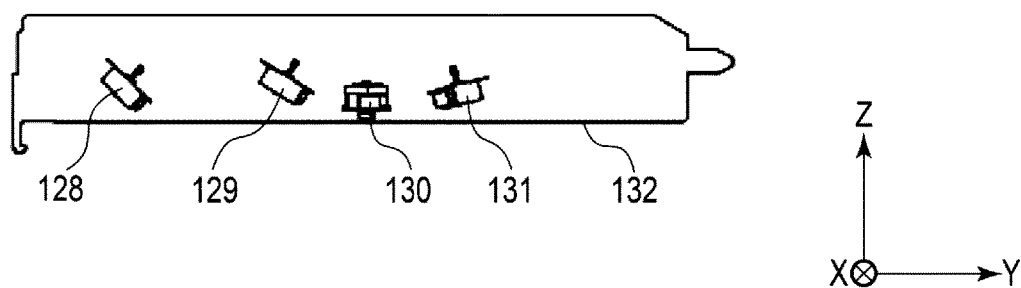
FIG. 1B is a schematic diagram illustrating a laser scanning unit of the image forming apparatus, according to exemplary embodiments.
Figure 3:
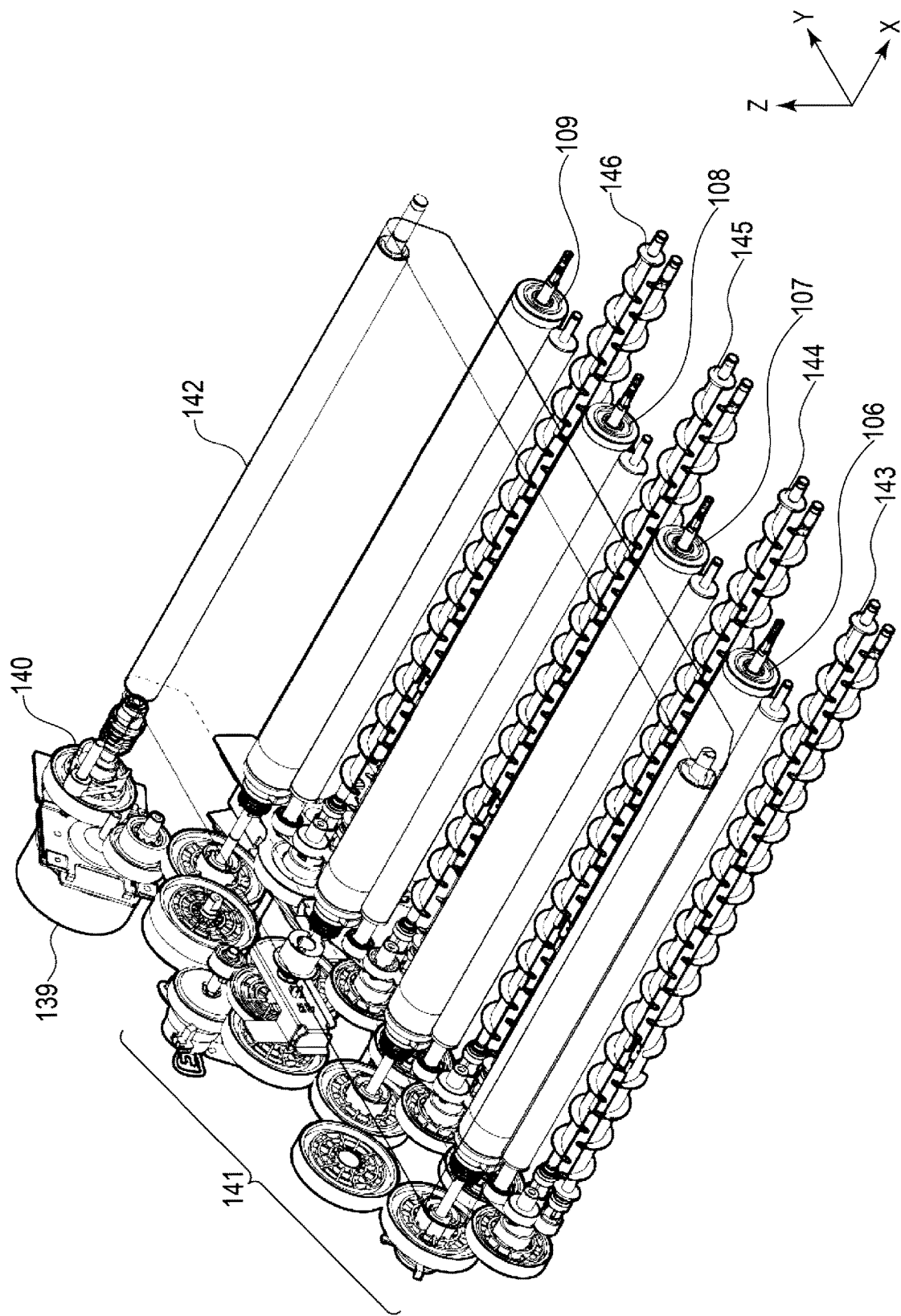
FIG. 3 is a perspective view of a drum and TBU driving unit together with the image forming apparatus as seen in in FIG. 1A.

FIG. 1A is a schematic cross-sectional view of an image forming apparatus, according to exemplary embodiments. FIG. 1B is a schematic diagram illustrating a laser scanning unit of the image forming apparatus, according to exemplary embodiments. FIG. 2 is a schematic cross-sectional view of an electrophotographic process unit as seen in FIG. 1A. FIG. 3 is a perspective view of a drum and TBU driving unit together with the image forming apparatus as seen in in FIG. 1A . An image forming apparatus 100 is explained with reference to FIGS. 1A, 1B, 2, and 3. Unless particularly noted otherwise, in this embodiment, a main scanning direction is represented as an X direction and a sub-scanning direction is represented as a Y direction.

The image forming apparatus 100 performs printing according to an electrophotographic scheme. The image forming apparatus 100 is, for example, an MFP (multifunction peripheral), a copying machine, a printer, or a facsimile machine. As illustrated in FIG. 1A, the image forming apparatus 100 includes, as an example, a scanner unit 101, a paper discharge tray 102, a transfer belt 103, an electrophotographic process unit (EPU) 156, a paper feeding cassette 114, a manual feed tray 115, a registration roller 116, an image quality maintenance control unit 117, a secondary transfer roller 118, an automatic duplexing unit (hereinafter referred to as ADU) 119, a paper discharge section (a reversing section) 120, a fixing device 121, a laser scanning unit (LSU) 132, and a control panel 133.

The EPU 156 prints an image according to the electrophotographic scheme. That is, the EPU 156 forms an image on an image forming medium P or the like using toner. The image forming medium P is, for example, sheet-like paper. The scanner unit 101 reads an image from an original document or the like on which the image is formed. For example, the image forming apparatus 100 realizes an original document copy by printing read data read from the original document or the like using the scanner unit 101 on the image forming medium P using the EPU 156.

The paper feeding cassette 114 stores the image forming medium P used for printing.

The manual feed tray 115 is a stand for manually feeding the image forming medium P.

A paper feeding roller rotates according to an action of a motor to provide the image forming medium P stored in the paper feeding cassette 114 or in the manual feed tray 115.

The image forming apparatus 100 includes, as an example, four toners, that is, Y toner 124, M toner 125, C toner 126, and K toner 127. The Y toner 124, the M toner 125, the C toner 126, and the K toner 127 store toners to be supplied to the EPU 156. The Y toner 124, the M toner 125, the C toner 126, and the K toner 127 respectively store toners corresponding to colors of YMCK (yellow, magenta, cyan, and key (black)). The colors stored by the toners are not limited to the colors of YMCK and may be other colors. The toners may be special toners. For example, the toners may store decolorable toners that are decolored at a temperature higher than a predetermined temperature to change to an invisible state.

The EPU 156 is explained with reference to FIG. 2. FIG. 2 is a schematic cross-sectional view of the electrophotographic process unit (EPU) (e.g., an electrophotographic process system, etc.) illustrated in FIG. 1A. The EPU 156 transfers toner images formed on photoconductive bodies rotating around rotation axes extending in the main scanning direction onto a sheet conveyed in a sub-scanning direction orthogonal to the main scanning direction. The EPU 156 includes, as an example, a Y drum 106, an M drum 107, a C drum 108, and a K drum 109. Further, the EPU 156 includes a Y developing device 110, an M developing device 111, a C developing device 112, a K developing device 113, a Y drum unit 134, an M drum unit 135, a C drum unit 136, a K drum unit 137, and a drum thermistor 138. The Y developing device 110, the M developing device 111, the C developing device 112, and the K developing device 113 develop electrostatic latent images on respective surfaces of the Y drum 106, the M drum 107, the C drum 108, and the K drum 109 using the toners supplied from the Y toner 124, the M toner 125, the C toner 126, and the K toner 127 corresponding to the Y developing device 110, the M developing device 111, the C developing device 112, and the K developing device 113. Consequently, toner images are formed on the respective drum surfaces. The toner images formed on the drum surfaces are transferred (e.g., primarily transferred, etc.) onto the transfer belt 103.

A developer is a mixture of toner and carrier and is included in the developing devices for the colors. The developer is agitated in the developing devices, the toner is charged to negative polarity, and the carrier is charged to positive polarity by friction of agitation. The charged toner is supplied to a drum surface by a magnet roller and adheres to a low-potential portion of the drum in response to a developing bias applied to the magnet roller.

The drum and TBU driving unit is explained with reference to FIG. 3. FIG. 3 is a perspective view of the drum and TBU driving unit together with the image forming apparatus 100 illustrated in FIG. 1A. The drum and TBU driving unit include, as an example, a drum and TBU motor 139, a gear 140, a TBU driving roller 142, the Y drum 106, the M drum 107, the C drum 108, the K drum 109, a Y mixer 143, an M mixer 144, a C mixer 145, and a K mixer 146. The drum and TBU driving unit drives the Y drum 106, the M drum 107, the C drum 108, the K drum 109, and the transfer belt 103. The drum and TBU driving unit performs an operation of a contact and separation mechanism for the transfer belt 103.

In some embodiments, the LSU 132 includes, as an example, a polygon mirror motor 128, a Y mirror motor 129, an M mirror motor 130, and a C mirror motor 131. The LSU 132 irradiates the drums with laser light to form electrostatic latent images on the drums based on a digital image signal transmitted from the scanner unit 101, a USB, a network, or the like.

In some embodiments, the transfer belt 103 is, for example, an endless belt and is capable of rotating according to the action of a roller. The transfer belt 103 rotates to convey the images transferred from the EPU 156 in the Y direction to a position of the secondary transfer roller 118.

The secondary transfer roller 118 transfers (secondarily transfers) the images formed on the transfer belt 103 onto the image forming medium P passing between the secondary transfer roller 118 and the TBU driving roller 142.

The fixing device 121 heats and pressurizes the image forming medium P onto which the images are transferred. Consequently, the images transferred onto the image forming medium P are fixed. The fixing device 121 includes a fixing belt 122 and a pressurizing roller 123 opposed to each other.

In some embodiments, the fixing belt 122 is, for example, a roller including a heat source for heating the fixing belt 122. The heat source is, for example, a heater. The roller heated by the heat source heats the image forming medium P.

Alternatively, in some embodiments, the fixing belt 122 may include an endless belt suspended by a plurality of rollers. For example, the fixing belt 122 includes a plate-like heat source, an endless belt, a belt conveying roller, a tension roller, and a press roller. The endless belt is, for example, a film-like member. The belt conveying roller drives the endless belt. The tension roller applies tension to the endless belt. An elastic layer is formed on a surface of the press roller. The plate-like heat source is in contact with, on a heat generating section side, an inner side of the endless belt and is pressed in a press roller direction to form a fixing nip having a predetermined width between the plate-like heat source and the press roller.

In the endless belt, for example, a silicon rubber layer having thickness of approximately 200 μm is formed on the outer side on a SUS (steel use stainless) substrate having thickness of approximately 50 μm or polyimide, which is heat resistant resin, having thickness of approximately 70 μm. The outermost circumference of the endless belt is coated with a surface protection layer of perfluoroalkoxy alkane (PFA) or the like. In the press roller, for example, a silicon sponge layer having thickness of approximately 5 mm is formed on an iron bar surface having a diameter of approximately 10 mm. The outermost circumference of the press roller is coated with a surface protection layer of PFA or the like.

In the plate-like heat source, for example, a glaze layer and a heat generation resistance layer are stacked on a ceramic substrate. A heat sink made of aluminum is bonded to the plate-like heat source in order to allow excess heat to escape to the opposite side and prevent a warp of the substrate. The heat generation resistance layer is formed of a known material such as TaSiO2 and is divided into a predetermined length and a number of pieces in the X direction.

The pressurizing roller 123 pressurizes the image forming medium P passing between the pressurizing roller 123 and the fixing belt 122.

The paper discharge section (the reversing section) 120 discharges the image forming medium P, on which toner is fixed, to the paper discharge tray 102. The paper discharge section (the reversing section) 120 is an exclusive path for switching back the image forming medium P to the ADU 119 at a duplex printing time. The paper discharge section (the reversing section) 120 includes a reversing gate and switches a conveying path for the image forming medium P of the paper discharge section (the reversing section) 120.

If duplex printing on the image forming medium P is executed, the ADU 119 reverses the image forming medium P. The ADU 119 switches back the image forming medium P with the paper discharge section (the reversing section) 120 after an end of a fixing process for one side, conveys the image forming medium P to a registration section in a reversed state, and enables printing on an other side to be executed.

In some embodiments, the scanner unit 101 reads an image from an original document. The scanner unit 101 is equivalent to a scanner for reading an image from an original document. The scanner is, for example, an optical reduction type scanner including an imaging element such as a charge-coupled device (CCD) image sensor. Alternatively, the scanner is a contact image sensor (CIS) type including an imaging element such as a complementary metal-oxide-semiconductor (CMOS) image sensor. Alternatively, the scanner is another publicly-known type.

In some embodiments, the control panel 133 functions as a user interface and includes buttons and a touch panel that an operator of the image forming apparatus 100 operates. The touch panel is, for example, obtained by stacking a display such as a liquid crystal display or an organic light-emitting diode (EL) display and a pointing device operated by a touch input. Therefore, the buttons and the touch panel function as an input device that receives an operation by the operator of the image forming apparatus 100. The display included in the touch panel functions as a display device that notifies various kinds of information to the operator of the image forming apparatus 100.

Figure 4:
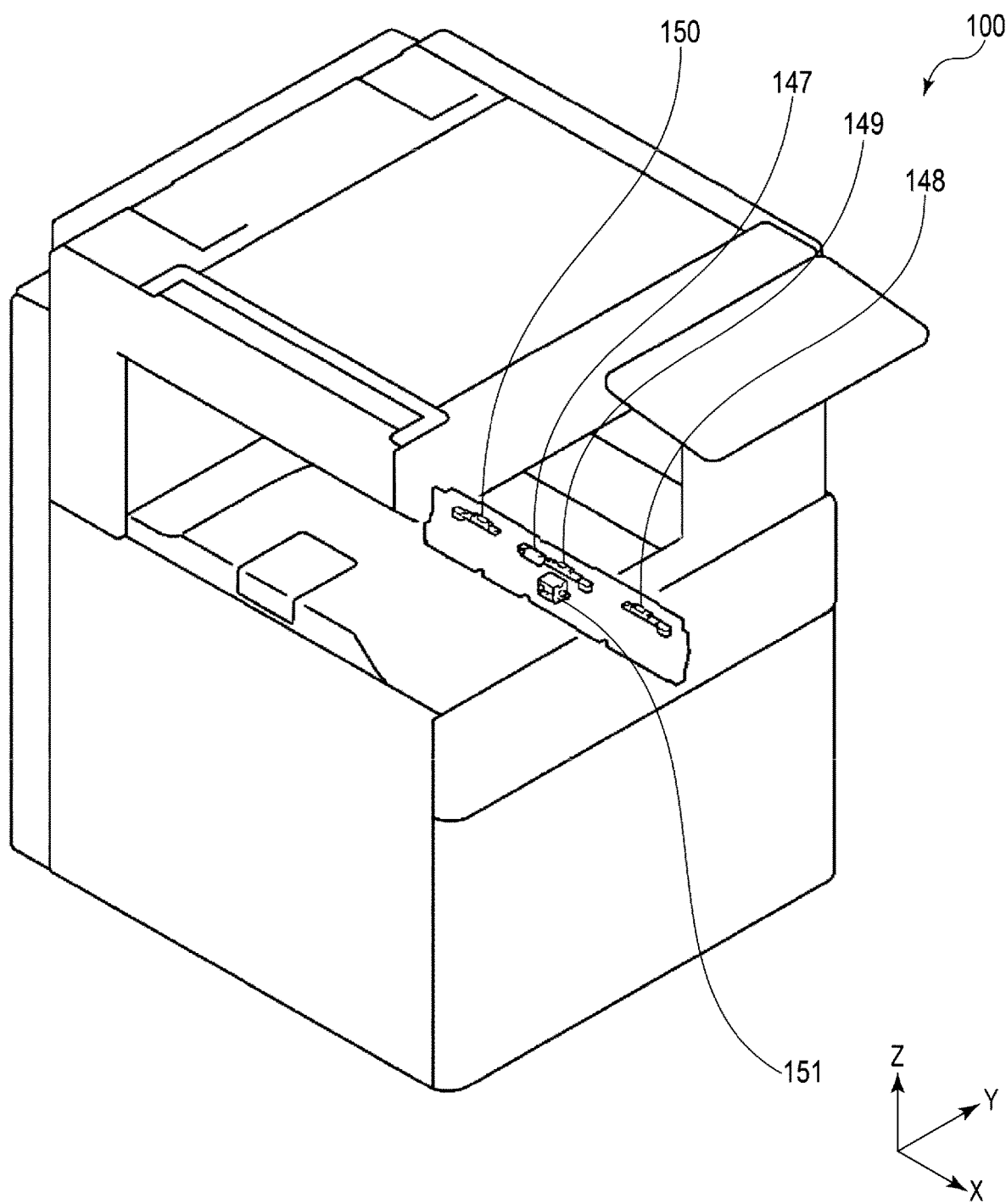
FIG. 4 is a perspective view of an image quality maintenance control unit together with the image forming apparatus as seen in FIG. 1A.
Figure 5:
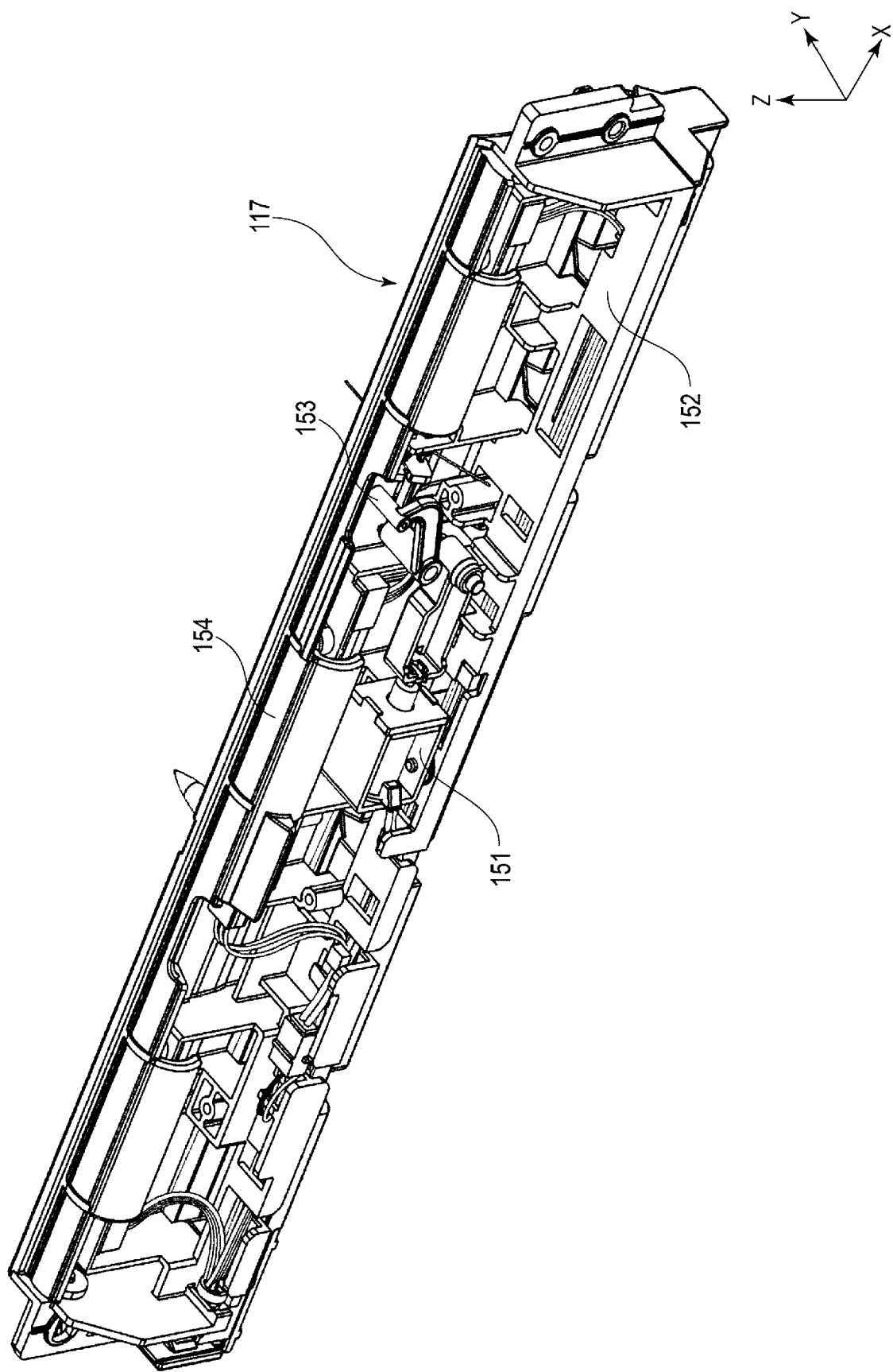
FIG. 5 is a perspective view of the image quality maintenance control unit as seen in FIG. 4.
Figure 6:
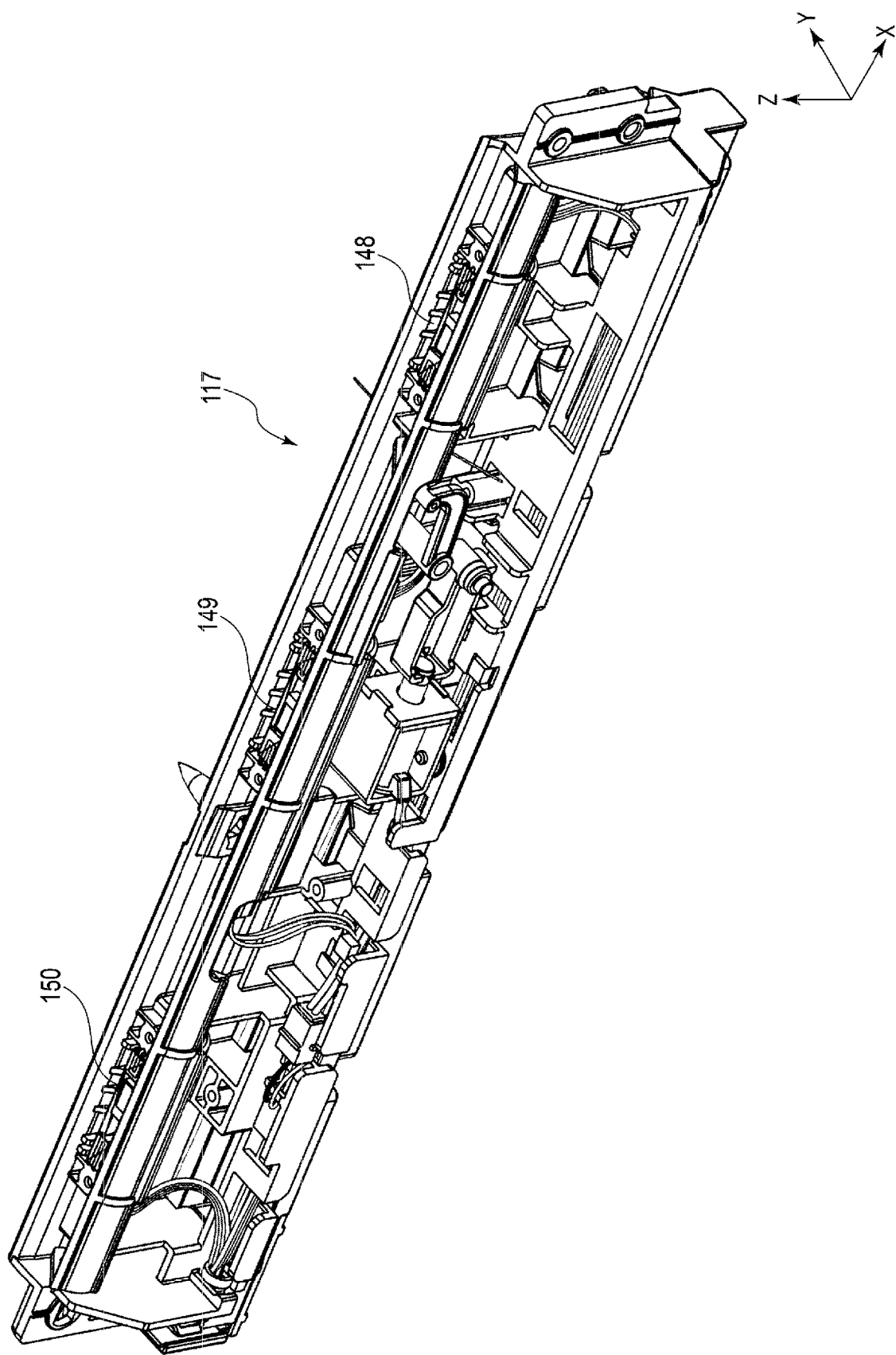
FIG. 6 is a perspective view of the image quality maintenance control unit illustrated in FIG. 4 in a shutter open state.
Figure 7:
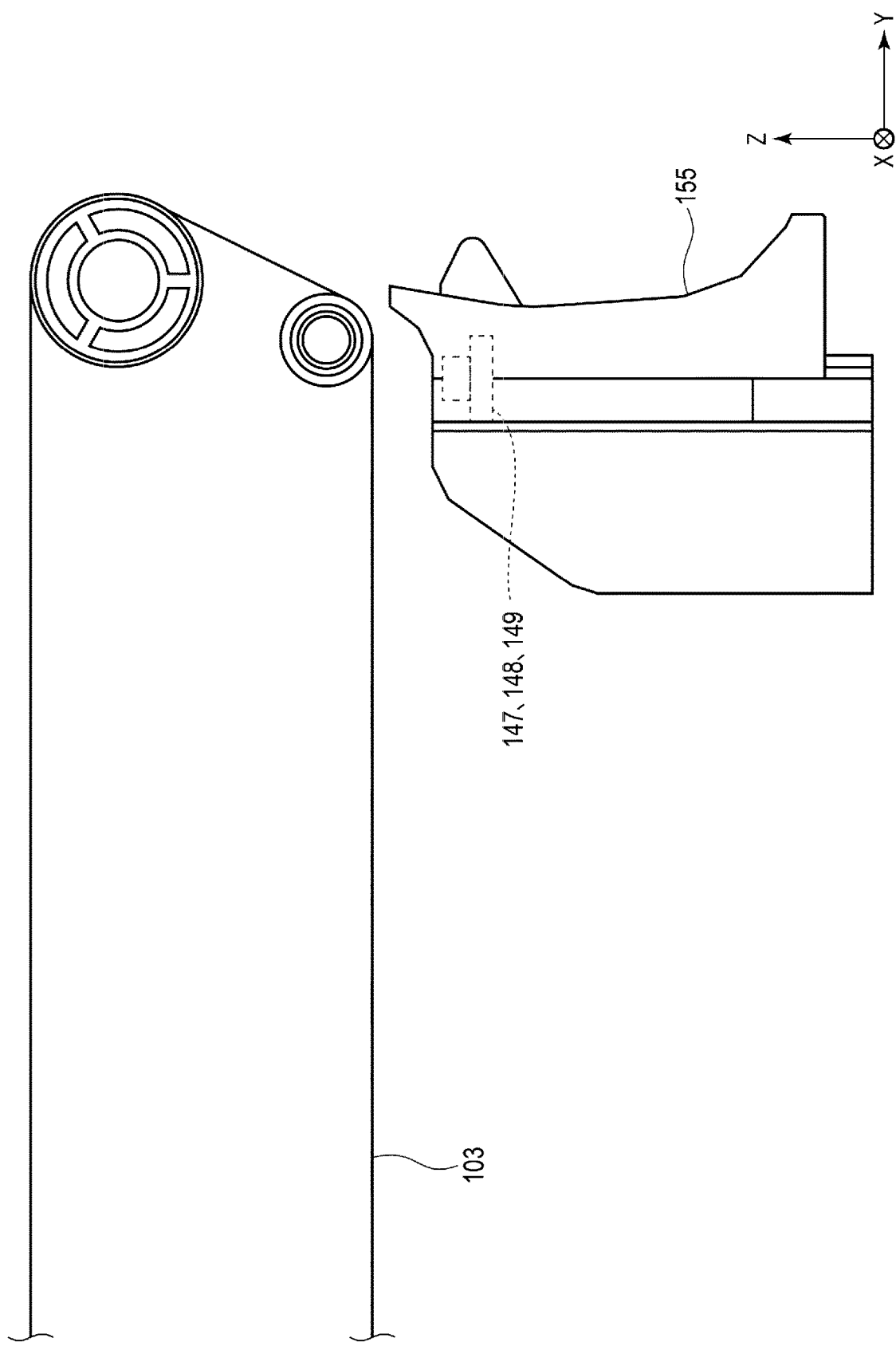
FIG. 7 is a schematic cross-sectional view of an image quality maintenance control unit periphery together with the image quality maintenance control unit as seen in FIG. 4.

The image quality maintenance control unit 117 is explained with reference to FIGS. 4, 5, 6, and 7. FIG. 4 is a perspective view of an image quality maintenance control unit 117 together with the image forming apparatus 100 as seen in FIG. 1A. FIG. 5 is a perspective view of the image quality maintenance control unit 117 as seen in FIG. 4. FIG. 6 is a perspective view of the image quality maintenance control unit 117 illustrated in FIG. 4 in a shutter open state. FIG. 7 is a schematic cross-sectional view of an image quality maintenance control unit periphery together with the image quality maintenance control unit as seen in FIG. 4. In the first embodiment, image quality maintenance control by the image quality maintenance control unit 117 is explained as an example of performance keeping control.

Referring to FIG. 4, in some embodiments, the image quality maintenance control unit 117 includes, as an example, a registration passage sensor 147, an image detection sensor (front) 148, an image detection sensor (center) 149, an image detection sensor (rear) 150, a sensor shutter solenoid 151, a unit base 152, a lever 153, and a shutter 154.

The image quality maintenance control unit 117 performs image quality maintenance control based on a pattern for adjustment formed on the transfer belt 103. For example, the image quality maintenance control includes image quality adjustment control and color registration control. The image quality maintenance control unit 117 changes image forming conditions and adjusts image concentration and gradation reproducibility according to image quality adjustment control. The image quality adjustment control minimizes changes in the image concentration and the gradation reproducibility due to an environment of use and a life (e.g., operational life, period of use, etc.) of expendables. The image quality maintenance control unit 117 adjusts printing positions of the colors according to color registration control. The color registration control adjusts color reproducibility and prevents a color drift.

An example of the operation of the image quality adjustment control is explained. The image quality maintenance control unit 117 causes the image detection sensor 149 to operate in a state in which a toner image is not formed on the transfer belt 103. Thereafter, the image detection sensor 149 outputs a reflected light amount voltage, converts the output voltage from an analog signal to a digital signal, and outputs a reflected light amount signal. The image quality maintenance control unit 117 performs adjustment of a light source light amount voltage of the image detection sensor 149 such that the output reflected light amount signal coincides with a preset value and stores an output value of the reflected light amount signal at that time in a memory. The output value is set as a read value of a belt surface. Subsequently, the image quality maintenance control unit 117 develops a test pattern on the transfer belt 103 and outputs a reflected light amount signal at that time. An output value of the reflected light amount signal is set as a read value of a toner image. The image quality maintenance control unit 117 sets a difference between the read value of the belt surface and the read value of the toner image as a toner adhesion amount and determines image forming conditions and image processing conditions to bring the toner adhesion amount close to a present value.

Referring to FIG. 7, the image detection sensor 148, the image detection sensor 149, and the image detection sensor 150 are attached to the inner side of a pre-secondary transfer guide 155 present on the lower side of the transfer belt 103. The image detection sensor 149 has two functions of an image detection sensor and a toner adhesion amount sensor.

The sensor shutter solenoid 151 drives a shutter 154 that covers the image detection sensor 148, the image detection sensor 149, and the image detection sensor 150. A lever 153 opens and closes the shutter 154 in association with the driving of the sensor shutter solenoid 151.

The shutter 154 protects the image detection sensor 148, the image detection sensor 149, and the image detection sensor 150 in operations other than an image quality maintenance control operation in order to prevent residue accumulation (e.g., dirt, etc.) due to toner scattering from the transfer belt 103.

The pre-secondary transfer guide 155 holds the image forming medium P discharged from the EPU 156 and conveys the image forming medium P in the direction of the secondary transfer roller 118.

Figure 8:
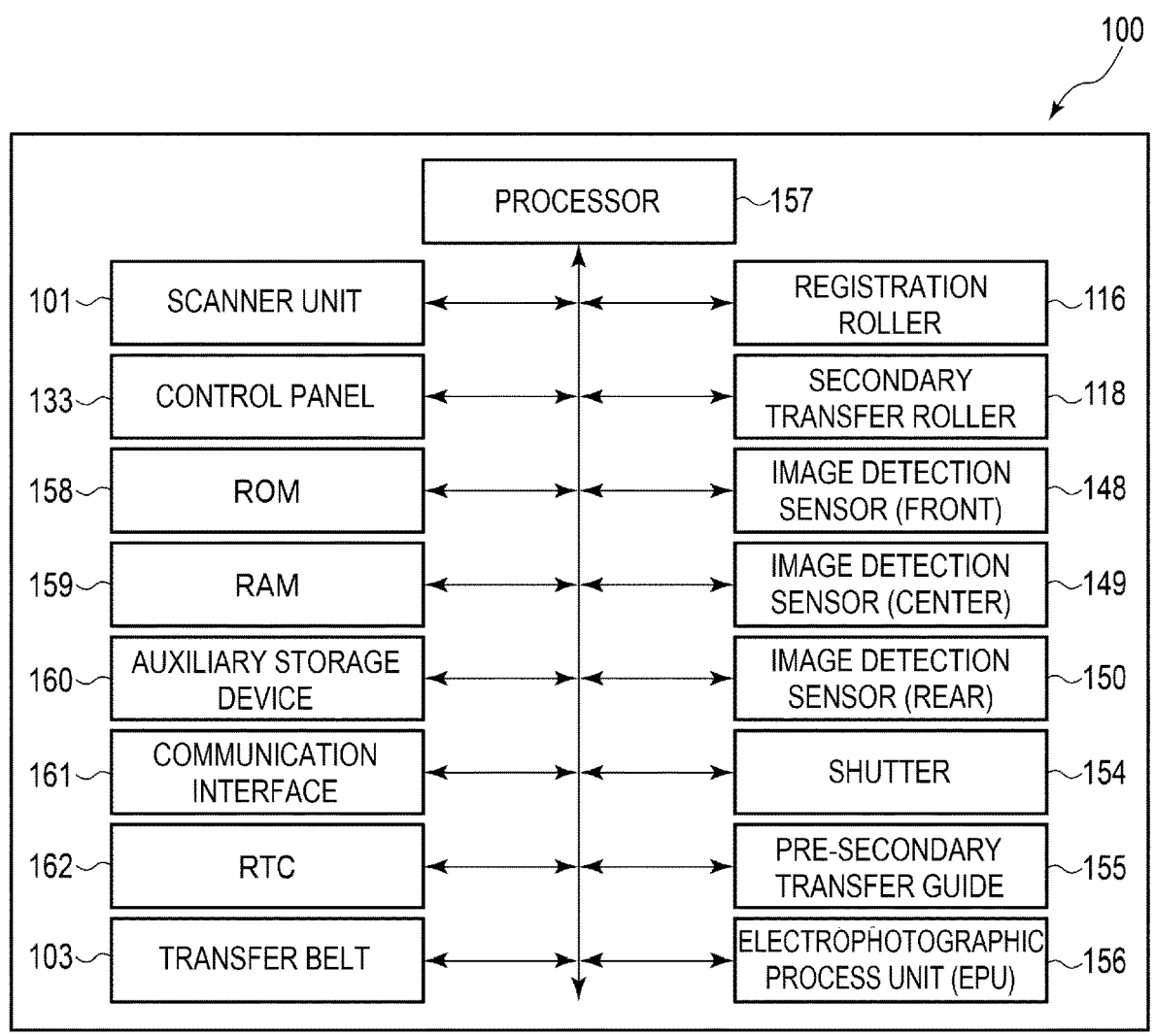
FIG. 8 is a block diagram illustrating a circuit configuration of the image forming apparatus, according to an exemplary embodiment.

FIG. 8 is a block diagram illustrating a circuit configuration of the image forming apparatus 100, according to an exemplary embodiment. The image forming apparatus 100 includes, as an example, a processor 157, the scanner unit 101, the control panel 133, a ROM (read-only memory) 158, a RAM (random-access memory) 159, an auxiliary storage device 160, a communication interface 161, an RTC (real-time clock) 162, the transfer belt 103, the registration roller 116, the secondary transfer roller 118, the image detection sensor 148, the image detection sensor 149, the image detection sensor 150, the shutter 154, the pre-secondary transfer guide 155, and the EPU 156.

The processor 157 is equivalent to a central part of a computer that performs processing such as computation and control necessary for the operation of the image forming apparatus 100. The processor 157 controls the sections based on a program such as system software, application software, or firmware stored in the ROM 158, the auxiliary storage device 160, or the like in order to realize various functions of the image forming apparatus 100. The processor 157 is, for example, a CPU (central processing unit), an MPU (micro processing unit), an SoC (system on a chip), a DSP (digital signal processor), a GPU (graphics processing unit), an ASIC (application specific integrated circuit), a PLD (programmable logic device), or an FPGA (field-programmable gate array). Alternatively, the processor 157 is a combination of a plurality of devices among these devices.

The ROM 158 is a non-transitory computer-readable storage medium and is equivalent to a main storage device of the computer including the processor 157 as the central part. The ROM 158 is a nonvolatile memory exclusively used for reading out data. The ROM 158 stores data, various setting values, or the like used by the processor 157 in performing various kinds of processing.

The RAM 159 is equivalent to the main storage device of the computer including the processor 157 as the central part. The RAM 159 is a memory used for reading and writing data. The RAM 159 is used as a so-called work area or the like where the processor 157 temporarily stores data in performing the various kinds of processing. The RAM 159 includes a page memory in which printing data is loaded.

The auxiliary storage device 160 is a non-transitory computer-readable storage medium and is equivalent to an auxiliary storage device of the computer including the processor 157 as the central part. The auxiliary storage device 160 is, for example, an EEPROM™ (electric erasable programmable read-only memory), an HDD (hard disk drive), or an SSD (solid state drive). The auxiliary storage device 160 saves data used by the processor 157 in performing the various kinds of processing, data generated by the processing in the processor 157, various setting values, or the like.

For example, the auxiliary storage device 160 is a memory that stores various kinds of information. The auxiliary storage device 160 stores the number of prints, a print ratio, a print amount, a plurality of divided sections, a plurality of monitoring target units (e.g., monitoring target groupings, etc.), and a plurality of monitoring sections. The monitoring sections correspond to predetermined sections included in the divided sections. The divided sections stored by the auxiliary storage device 160 are position information of the divided sections. The monitoring target units stored by the auxiliary storage device 160 are identification information of the monitoring target units. The monitoring sections stored by the auxiliary storage device 160 are position information of the monitoring sections.

Figure 9:
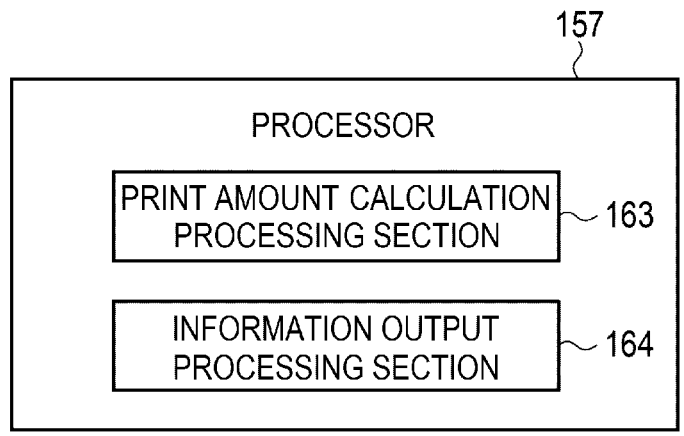
FIG. 9 is a block diagram illustrating a configuration of a processor of the image forming apparatus, according to an exemplary embodiment.

Referring to FIGS. 7-9, the processor 157 sets, based on a print region of the page memory, the plurality of divided sections in an X direction of the print region and outputs the position information indicating the divided sections to the auxiliary storage device 160. Since the divided sections depend on a length in the main scanning direction of the print region, the divided sections change according to a paper size of the image forming medium P to which the image forming apparatus 100 is adaptable. The processor 157 may set fixed divided sections stored in the auxiliary storage device 160 before shipment or may selectively set divided sections from the plurality of divided sections stored in the auxiliary storage device 160 before shipment. Sections corresponding to the main scanning direction may be read as regions corresponding to the main scanning direction and the sub-scanning direction.

In some embodiments, the processor 157 calculates a ratio of print (hereinafter referred to as print ratio) of each of the divided sections and outputs the calculated print ratio to the auxiliary storage device 160. The processor 157 may calculate the print ratio using a degree of monochrome as an indicator or using a degree of color as an indicator. The processor 157 calculates the print ratio as an indicator suitable for a state of use and outputs the print ratio to the auxiliary storage device 160.

The processor 157 counts the number of prints based on a detection signal of the image forming medium P discharged from the EPU 156 and outputs the counted number of prints to the auxiliary storage device 160. The processor 157 may count the number of prints based on read data or printing data. The number of prints includes a total number of prints from a start of use of the image forming apparatus 100 to the present and the number of prints in a fixed period from reception of a count reset to the present.

The processor 157 calculates, from the calculated print ratio in each of the plurality of divided sections corresponding to the X direction and the number of prints, a print amount in each of the divided sections and outputs the print amount to the auxiliary storage device 160. The processor 157 calculates the print amount in each of the divided sections by multiplying the print ratio of each of the divided sections by the number of prints. A calculation method for the print amount is not limited to the method explained above. The print amount can also be calculated using other parameters.

As explained above, the auxiliary storage device 160 stores the print amounts in the plurality of divided sections corresponding to the X direction.

In some embodiments, the image forming apparatus 100 may include, instead of or in addition to the auxiliary storage device 160, an interface into which a storage medium such as a removable optical disk, a memory card, or a USB memory can be inserted.

Programs stored in the ROM 158 or the auxiliary storage device 160 include a program for executing processing explained below. As an example, the image forming apparatus 100 is transferred to an administrator or the like of the image forming apparatus 100 in a state in which the program is stored in the ROM 158 or the auxiliary storage device 160. However, the image forming apparatus 100 may be transferred to the administrator or the like in a state in which the program is not stored in the ROM 158 or the auxiliary storage device 160. The program for executing the processing explained below may be separately transferred to the administrator or the like and written in the ROM 158 or the auxiliary storage device 160 under operation by the administrator or a serviceperson. The transfer of the program at this time can be realized, for example, by recording the program in a removable storage medium such as a magnetic disk, a magneto-optical disk, an optical disk, a semiconductor memory, or by download via a network or the like.

The communication interface 161 is an interface for the image forming apparatus 100 to communicate with, for example, a client terminal or a server 200 via a network (e.g., wireless network, LAN, etc.) or the like. For example, the communication interface 161 receives printing data transmitted from the client terminal. The image forming apparatus 100 realizes original document printing by printing, using the EPU 156, printing data received via the communication interface 161 on the image forming medium P.

In some embodiments, the RTC 162 is a timepiece, a circuit incorporating a timepiece function, or the like.

An example of the configuration of the processor 157 of the image forming apparatus 100 is explained with reference to FIG. 9. FIG. 9 is a block diagram illustrating a configuration of a processor of the image forming apparatus, according to an exemplary embodiment.

The processor 157 includes a print amount calculation processing section 163 and an information output processing section 164. The processor 157 realizes functions of the print amount calculation processing section 163 and the information output processing section 164 by executing a program stored in the ROM 158, the auxiliary storage device 160, or the like. The print amount calculation processing section 163 and the information output processing section 164 may be realized by hardware such as an LSI (large scale integration), an ASIC (application specific integrated circuit), and an FPGA (field-programmable gate array) having the same function as the function of the processor 157 executing the program.

The print amount calculation processing section 163 performs print amount calculation processing at a predetermined timing. For example, the print amount calculation processing section 163 sets, based on position information of the print region of the image forming medium P, a plurality of divided sections in the print region, calculates a print ratio in each of the divided sections, multiplies together the number of prints and the print ratio, and outputs a print amount for each of the divided sections to the auxiliary storage device 160. Alternatively, the print amount calculation processing section 163 may set fixed divided sections stored in the auxiliary storage device 160 before shipment or may selectively set divided sections from the plurality of divided sections stored in the auxiliary storage device 160 before shipment.

The information output processing section 164 executes information output processing. After the print amount calculation processing is executed, for example, the information output processing section 164 acquires the print amount for each of the divided sections stored in the auxiliary storage device 160, acquires, from the auxiliary storage device 160, a monitoring section linked with the monitoring target unit in advance, compares a dirt ratio corresponding to an integrated print amount in the monitoring section and a threshold, and outputs information corresponding to a comparison result.

Figure 10:
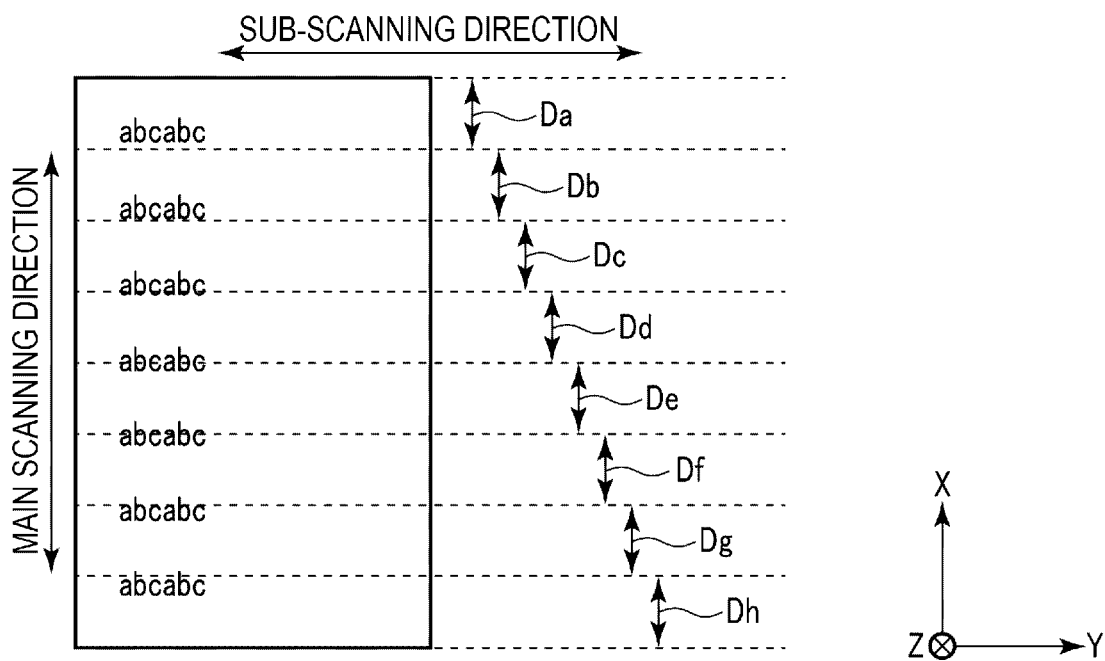
FIG. 10 is a diagram illustrating division of a print region, according to exemplary embodiments.

Divided sections set for the print region are explained with reference to FIG. 10. FIG. 10 is a diagram illustrating division of a print region, according to exemplary embodiments. In FIG. 10, the processor 157 sets eight divided sections Da to Dh for the print region of the image forming medium P in the main scanning direction, that is, the X direction as a reference. The processor 157 may set a predetermined number of divided sections or may set divided sections as many as a number changed according to a state of use. The divided sections illustrated in FIG. 10 are equally divided eight sections. However, the divided sections may not always be equal.

Figure 11:
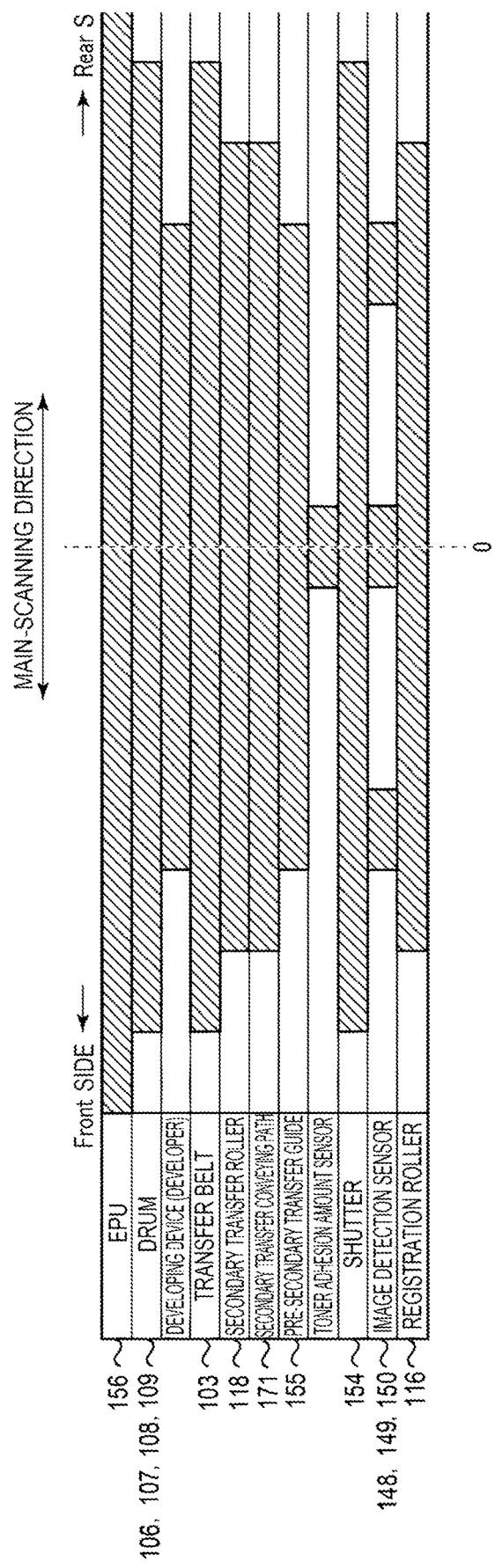
FIG. 11 is a diagram illustrating a comparative example of monitoring sections in monitoring target units, according to exemplary embodiments.

A monitoring section in each of monitoring target units (e.g., monitoring target groupings, etc.) is explained with reference to FIG. 11. FIG. 11 is a diagram illustrating a comparative example of monitoring sections in monitoring target units, according to exemplary embodiments. In FIG. 11, as examples of the monitoring target units, there are the EPU 156, the drums 106, 107, 108, and 109, the developing device (the developer), the transfer belt 103, the secondary transfer roller 118, a secondary transfer conveying path 171, the pre-secondary transfer guide 155, the toner adhesion amount sensor, the shutter 154, the image detection sensors 148, 149, and 150, and the registration roller 116. The monitoring sections in the monitoring target units are different in each of the monitoring target units. As an example, the monitoring sections could be portions to which scattered toner and dirt adhere.

For example, the processor 157 sets the monitoring sections in the monitoring target units based on a distance from a center O of the print region with the main scanning direction as a reference. For example, a monitoring section in the EPU 156 is a longest section corresponding to two or more divided sections and including the entire print region. Monitoring sections in the drums 106, 107, 108, and 109 and the transfer belt 103 are second longest sections corresponding to two or more divided sections and excluding both sides of the print region. Monitoring sections in the secondary transfer roller 118, the secondary transfer conveying path 171, and the registration roller 116 are third longest sections corresponding to two or more divided sections and excluding both the sides of the print region. Monitoring sections in the developing device and the pre-secondary transfer guide are fourth longest sections corresponding to two or more divided sections and excluding both the sides of the print region. A monitoring section in the toner adhesion amount sensor is a shortest section corresponding to one divided section and is at a predetermined distance from the center O of the print region. Monitoring sections in the image detection sensors 148, 149, and 150 are a plurality of sections corresponding to the sensors. The monitoring sections in the image detection sensors 148, 149, and 150 are a discontinuous plurality of sections. In this way, the monitoring sections in the monitoring target units may be continuous sections of the plurality of divided sections, may be discontinuous sections of the plurality of divided sections, or may be one divided section.

The monitoring sections in the monitoring target units may be stored in the auxiliary storage device 160 in advance before shipment of the image forming apparatus 100 or may be changed based on, for example, a state of use and based on an input from the control panel 133 after a start of use of the image forming apparatus 100.

Figure 12:
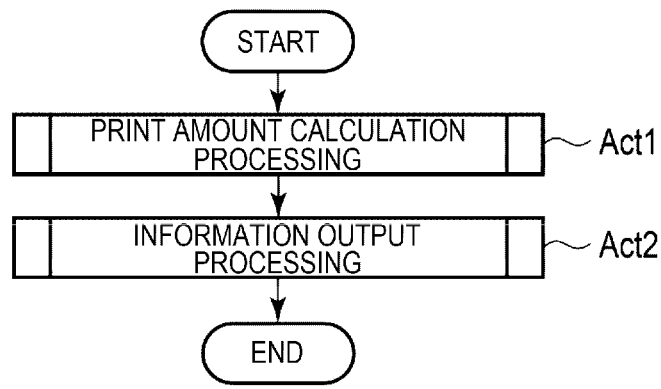
FIG. 12 is a flowchart illustrating an overall operation by the image forming apparatus, according to an exemplary embodiment.

An operation of the image forming apparatus 100 according to the first embodiment is explained with reference to FIGS. 12, 13, and 14. Content of processing in the following operation explanation is an example. Various kinds of processing capable of obtaining the same effects can be used as appropriate. FIG. 12 is a flowchart illustrating an overall operation by the image forming apparatus 100, according to an exemplary embodiment. The processor 157 executes the processing based on a program stored in the ROM 158, the auxiliary storage device 160, or the like. It is assumed that, unless specifically explained otherwise, the processing of the processor 157 transitions to Act (N+1) after Act N, N being a natural number.

The image forming apparatus 100 starts the processing illustrated in FIG. 12 at a predetermined timing. In Act 1, for example, the processor 157 (the print amount calculation processing section 163) detects a printing job for printing an image on the image forming medium P and sets the divided sections stored in the auxiliary storage device 160. The print amount calculation processing section 163 detects a print region included in read data or printing data. The print amount calculation processing section 163 calculates a print ratio in each of the plurality of divided sections based on the set divided sections and the detected print region. The print amount calculation processing section 163 multiplies together a present number of prints and the print ratio in each of the divided sections and outputs a print amount to the auxiliary storage device 160. The print amount calculation processing is explained in detail below.

In Act 2, after executing the print amount calculation processing, for example, the processor 157 (the information output processing section 164) acquires the print amount in each of the divided sections stored in the auxiliary storage device 160. As an example, the information output processing section 164 acquires, from the auxiliary storage device 160, a monitoring section linked in advance with the monitoring target unit such as the image detection sensor 149 or the EPU 156. The information output processing section 164 calculates an integrated print amount in the monitoring section, compares a dirt ratio corresponding to the integrated print amount and a threshold, and outputs information corresponding to a comparison result. The information output processing is explained in detail below.

For example, the processor 157 executes the information output processing every time one or a plurality of original documents are printed from the read data. The processor 157 executes the information output processing every time one or a plurality of original documents are printed from the printing data. The processor 157 may execute the information output processing at a power-on timing, may execute the information output processing according to an information output request input from the control panel 133, or may execute the information output processing according to an information output request received from an external server via the communication interface 161. For example, the power-on timing is timing when a low power operation mode (a so-called sleep state or standby state) for consuming first power shifts to a normal mode for consuming second power larger than the first power.

Figure 13:
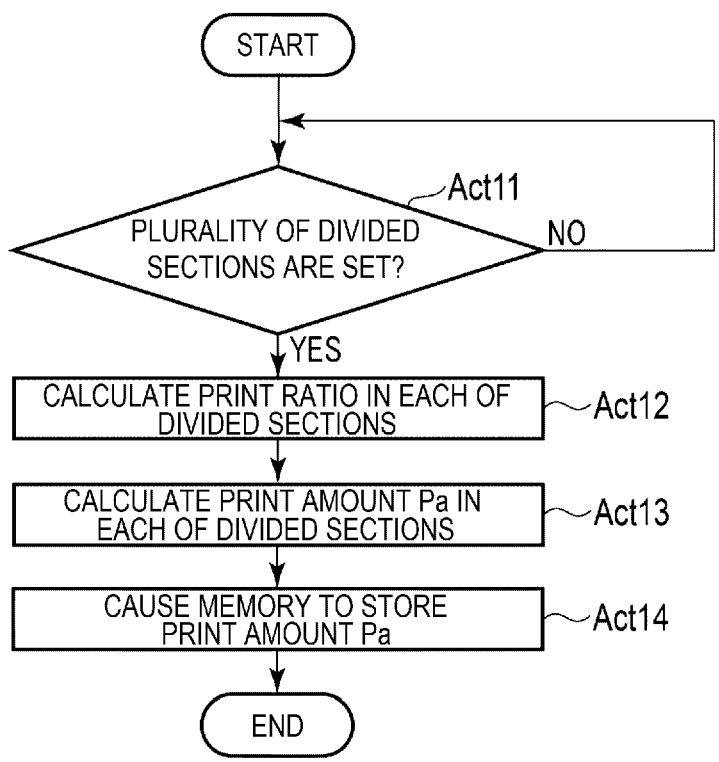
FIG. 13 is a flowchart illustrating a print amount calculation processing operation by the image forming apparatus, according to an exemplary embodiment.

FIG. 13 is a flowchart illustrating a print amount calculation processing operation by the image forming apparatus 100, according to an exemplary embodiment. That is, FIG. 13 is a flowchart for explaining, in detail, the print amount calculation processing in Act 1 illustrated in FIG. 12.

The image forming apparatus 100 starts processing as illustrated in FIG. 13. The processor 157 starts the processing at any timing, for example, when detecting a printing job for printing an image. The processor 157 sets the plurality of divided sections in the main scanning direction as an axis based on the print region of the page memory (YES in Act 11). After executing the processing in Act 11, the processor 157 calculates the print ratio in each of the divided sections (Act 12). For example, the processor 157 calculates a print ratio every time the image forming medium P is discharged. If the processor 157 detects that the image forming medium P is continuously discharged without a paper size and the like of the image forming medium P being changed, for example, the processor 157 calculates a print amount for each printing job or each predetermined number of prints.

The processor 157 calculates a present number of prints according to a detection result of the image forming medium P on which the image is printed. The processor 157 multiplies together the print ratio in each of the divided sections calculated in Act 12 and the present number of prints and calculates a print amount Pa in each of the divided sections (Act 13). In this way, the processor 157 may be configured to calculate the print amount Pa from the print ratio and the present number of prints or may be configured to calculate the print amount Pa from the number of prints if detecting that a print ratio of the entire print region exceeds a predetermined print ratio. The processor 157 causes the memory to store the print amount Pa in each of the divided sections (Act 14).

Figure 14:
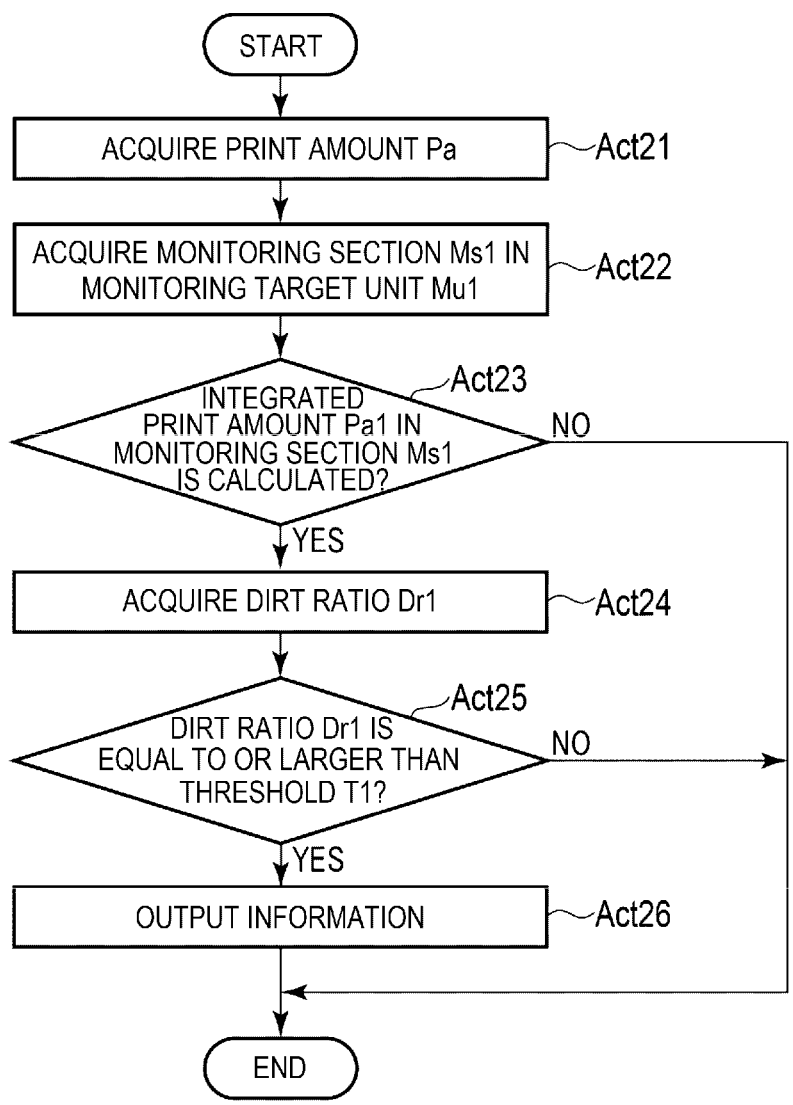
FIG. 14 is a flowchart illustrating an information output processing operation by the image forming apparatus, according to an exemplary embodiment.

FIG. 14 is a flowchart illustrating an information output processing operation by the image forming apparatus 100, according to an exemplary embodiment. That is, FIG. 14 is a flowchart for explaining, in detail, the information output processing in Act 2 illustrated in FIG. 12.

The processor 157 acquires the print amount Pa stored in the auxiliary storage device 160 (Act 21). The print amount Pa stored in the auxiliary storage device 160 is a print amount calculated in the print amount calculation processing and may not be a total print amount from a reset of a print amount to the present or may be a print amount calculated every time.

The processor 157 acquires a monitoring section Ms1 in a monitoring target unit Mu1 from the auxiliary storage device 160 (Act 22). The monitoring target unit Mu1 is the monitoring target unit illustrated in FIG. 11. The monitoring target unit Mu1 is not limited to the monitoring target unit as described above. For example, a monitoring target unit anticipated to hinder a print operation for the image forming medium P, such as if dirt due to toner scattering or the like accumulates because the printing operation on the image forming medium P is executed, can be the monitoring target unit. Monitoring sections are stored in the auxiliary storage device 160 or the like in advance and are set to correspond to predetermined sections included in divided sections. The processor 157 may change the monitoring sections according to a state of use or set divided sections.

The processor 157 acquires a print amount in a monitoring section corresponding to the monitoring section Ms1 for a print amount in each of the divided sections stored in the auxiliary storage device 160. The processor 157 adds the acquired print amount to a present print amount and calculates an integrated print amount Pa1 (YES in Act 23). If it is detected that the print amount added to the present print amount is 0 (NO in Act 23), the processor 157 maintains a value of the integrated print amount Pa1 and ends the processing.

After calculating the integrated print amount Pa1 in the monitoring section linked with the monitoring target unit, the processor 157 acquires a dirt ratio Dr1 corresponding to the integrated print amount Pa1 from the auxiliary storage device 160 (Act 24). The dirt ratio increases as an integrated print amount increases. A change in the dirt ratio is different depending on a monitoring target unit. For example, the dirt ratio is higher at the same integrated print amount in a monitoring target unit in which toner easily scatters compared with a monitoring target unit in which toner less easily scatters. The dirt ratio at the same integrated print amount changes both in an always exposed monitoring target unit and a monitoring target unit exposed only at an operation time.

The processor 157 compares the dirt ratio Dr1 linked with the monitoring target unit and a threshold T1 (Act 25). The processor 157 outputs information corresponding to a comparison result (Act 26). For example, if is detected that the dirt ratio Dr1 is equal to or larger than the threshold T1 (YES in Act 25), the processor 157 outputs information corresponding to a detection result (Act 26). For example, the control panel 133 outputs information indicating an abnormality with an image or sound. Alternatively, the control panel 133 may output information indicating the dirt ratio Dr1. If it is detected that the dirt ratio Dr1 is smaller than the threshold T1 (NO in Act 25), the processor 157 ends the processing.

For example, in the image quality maintenance control unit 117, if the shutter 154 is opened by a print operation or the like, toner deposits on the image detection sensor 148, the image detection sensor 149, and the image detection sensor 150, which shields sensor surfaces from light. Therefore, a dirt ratio increases and the print operation is sometimes hindered.

An output destination of information is not limited to the control panel 133 and only has to be a device capable of providing information to a user. For example, the communication interface 161 outputs (e.g., transmits, etc.) the information to a designated communication device. The designated communication device receives the information and provides (e.g., displays, etc.) the information to the user. The communication interface 161 outputs (e.g., transmits, etc.) the information to a designated other image forming apparatus 100. The designated other image forming apparatus 100 receives the information. The control panel 133 of the other image forming apparatus 100 provides (for example, displays) the information to the user. The communication interface 161 outputs (e.g., transmits, etc.) the information to a designated communication device. The designated communication device receives the information. A processor of the designated communication device realizes the function of the information output processing section 164 and provides (e.g., displays, etc.) a result of the information output processing to the user as the information.

The communication interface 161 outputs (e.g., transmits, etc.) the information to a designated communication device. The designated communication device receives the information. A processor of the designated communication device realizes the functions of the print amount calculation processing section 163 and the information output processing section 164 and provides (e.g., displays, etc.) results of the print amount calculation processing and the information output processing to the user as the information.

As explained above, the processor 157 records the print amounts in the plurality of divided sections corresponding to the main scanning direction according to the processing in Act 11 to Act 14 and Act 21 to Act 22 and outputs the information concerning the monitoring target unit corresponding to the print amount in the monitoring section according to the processing in Act 23 to Act 26. For example, the processor 157 outputs the information indicating the dirt ratio corresponding to the print amount in the monitoring section.

Figure 15:
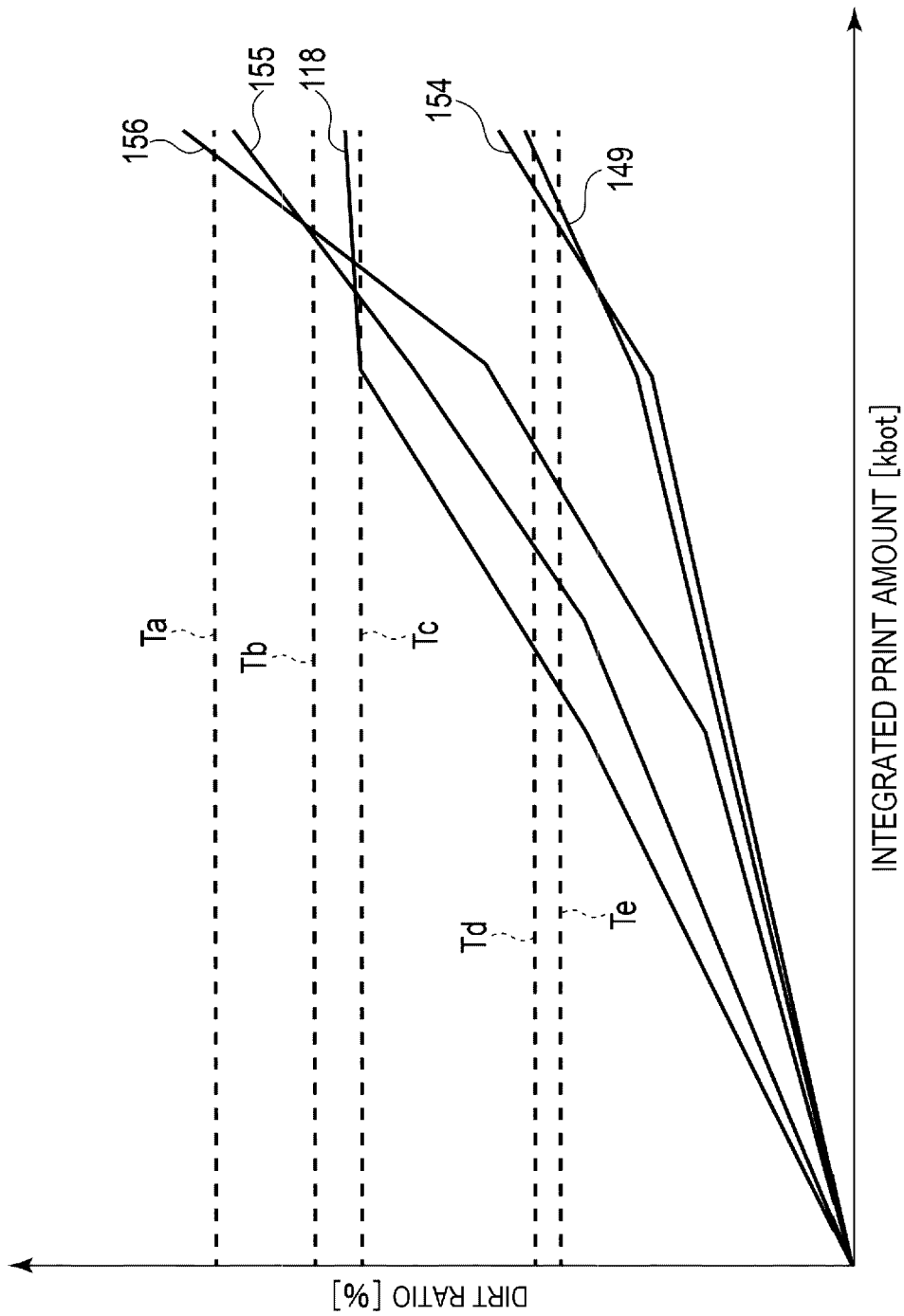
FIG. 15 is a diagram illustrating a correlation between an integrated print amount and a dirt ratio in each of the monitoring target units, according to an exemplary embodiment.

FIG. 15 is a diagram illustrating a correlation between an integrated print amount and a dirt ratio in each of the monitoring target units, according to an exemplary embodiment. FIG. 15 is a diagram illustrating an example of a threshold for a dirt ratio in each of the monitoring target units. In FIG. 15, a threshold Ta for a dirt ratio of an upper part of the EPU 156, a threshold Tb for a dirt ratio of the pre-secondary transfer guide 155, a threshold Tc for a dirt ratio of the secondary transfer conveying path 171, a threshold Td for a dirt ratio of the shutter 154, and a threshold Te for a dirt ratio of the image detection sensor 149 are illustrated.

For example, as illustrated in FIG. 15, a maximum value is the threshold Ta for the dirt ratio of the upper part of the EPU 156. The upper part of the EPU 156 is a monitoring target unit in which a distance between monitoring sections is larger and dirt from toner scattering or the like more easily accumulates compared with the other monitoring target units. Therefore, the maximum value is set for the threshold Ta. On the other hand, a minimum value is the threshold Te for the dirt ratio of the image detection sensor 149. The image detection sensor 149 is covered by the shutter 154 at times other than a print operation execution time. Therefore, the minimum value is set for the threshold Te. The processor 157 outputs information corresponding to the monitoring target units based on thresholds corresponding to the monitoring target units and detection results of print amounts in the monitoring sections in the monitoring target units. For example, the control panel 133 outputs maintenance information or the like corresponding to the monitoring target units. A maintenance person or a user can learn present dirt degrees (e.g., amounts, etc.) of the monitoring target units or appropriate timings for cleaning of the monitoring target units based on the maintenance information or the like output from the control panel 133. If image quality or the like is hindered because stain accumulates, it is easy to specify which monitoring target unit is a cause of the image quality deficiency, thereby preventing a failure or the like in advance.

[Second Embodiment]

A basic configuration of the image forming apparatus 100 in a second embodiment is the same as the basic configuration of the image forming apparatus 100 illustrated in FIGS. 1A, 1B, 2, 3, 4, 5, 6, 7, and 8 in the first embodiment. Therefore, explanation of the basic configuration is omitted. The auxiliary storage device 160 in the second embodiment stores the print amount Pa, a monitoring section Ms2 linked with a monitoring target unit Mu2, a monitoring section Ms3 linked with a monitoring target unit Mu3, an integrated print amount Pa2, an integrated print amount Pa3, a dirt ratio Dr2 corresponding to the integrated print amount Pa2, a dirt ratio Dr3 corresponding to the integrated print amount Pa3, a threshold T2, and a threshold T3. Division of a print region and a monitoring section in a monitoring target unit according to the second embodiment are the same as the division of the print region and the monitoring section in the monitoring target unit illustrated in FIGS. 10 and 11 in the first embodiment. Therefore, explanation of the division of the print region and the monitoring section in the monitoring target unit is omitted.

An overall operation by the image forming apparatus 100 according to the second embodiment and a print amount calculation processing operation by the image forming apparatus 100 according to the second embodiment are the same as the overall operation and the print amount calculation processing operation illustrated in FIGS. 12 and 13 in the first embodiment. Therefore, explanation of the overall operation and the print amount calculation processing operation is omitted.

An information output operation of the image forming apparatus 100 according to the second embodiment is explained below with reference to FIG. 16. Content of processing in the following operation explanation is an example. Various kinds of processing capable of obtaining the same result can be used as appropriate.

Figure 16:
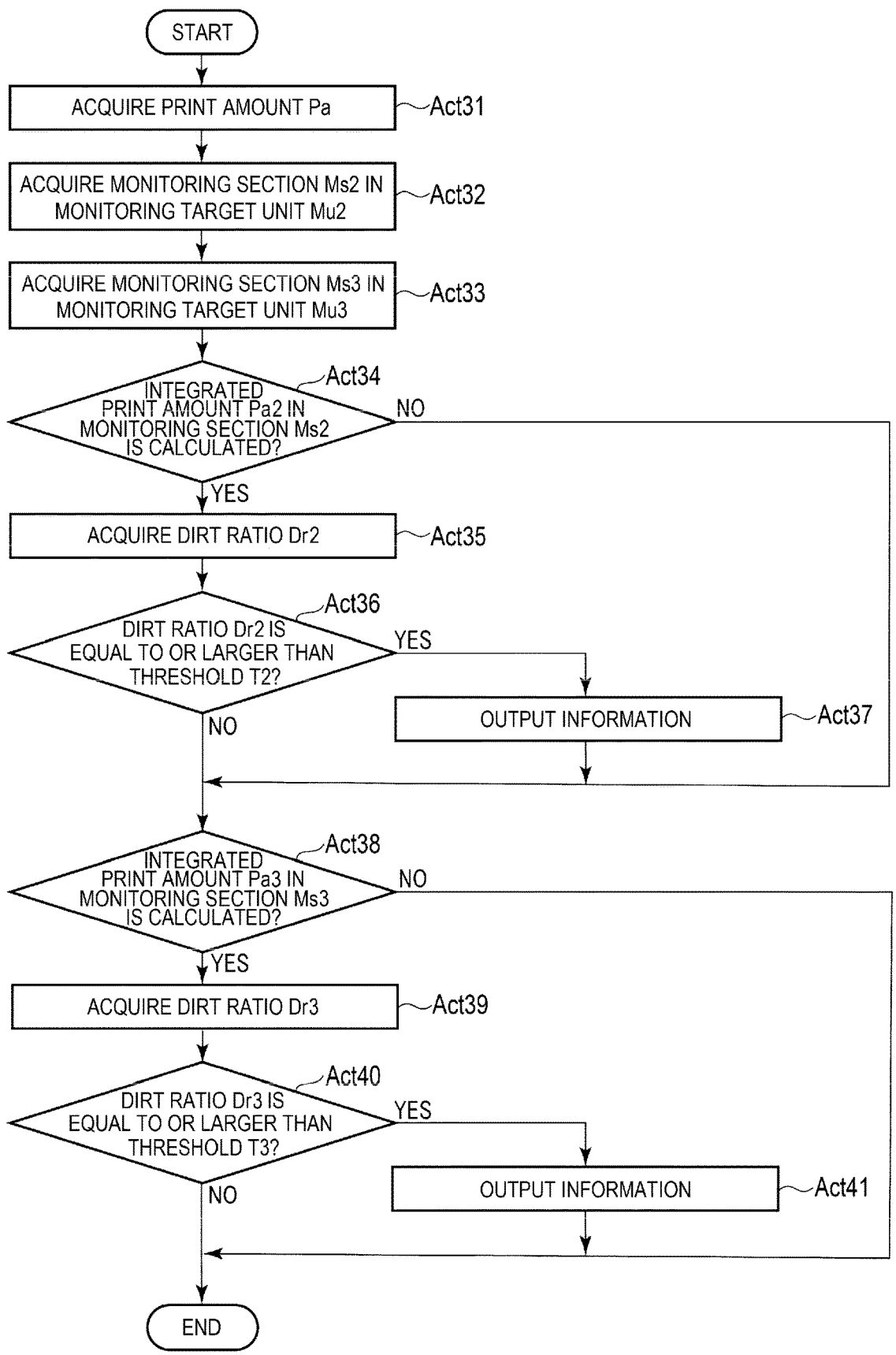
FIG. 16 is a flowchart illustrating an information output processing operation by the image forming apparatus, according to an exemplary embodiment.

FIG. 16 is a flowchart illustrating an information output processing operation by the image forming apparatus 100, according to an exemplary embodiment. That is, FIG. 16 is a flowchart for explaining, in detail, the information output processing in Act 2 illustrated in FIG. 12.

The processor 157 acquires the print amount Pa stored in the auxiliary storage device 160 (Act 31). The processor 157 acquires the monitoring section Ms2 in the monitoring target unit Mu2 from the auxiliary storage device 160 (Act 32). The processor 157 acquires the monitoring section Ms3 in the monitoring target unit Mu3 from the auxiliary storage device 160 (Act 33). In this embodiment, monitoring sections in the monitoring target unit Mu2 and the monitoring target unit Mu3 are acquired. However, not only this, but monitoring sections in a plurality of monitoring target units may be simultaneously acquired from the auxiliary storage device 160.

The processor 157 acquires a print amount in a section corresponding to the monitoring section Ms2 for a print amount in each of the divided sections stored in the auxiliary storage device 160. The processor 157 adds the acquired print amount to a present print amount and calculates the integrated print amount Pa2 (YES in Act 34). If it is detected that the print amount added to the present print amount is 0 (NO in Act 34), the processor 157 maintains a value of the integrated print amount Pa1 and transitions to processing in Act 38.

After calculating the integrated print amount Pa2 in the monitoring section linked with the monitoring target unit, the processor 157 acquires the dirt ratio Dr2 corresponding to the integrated print amount Pa2 from the auxiliary storage device 160 (Act 35). The processor 157 compares the dirt ratio Dr2 linked with the monitoring target unit and the threshold T2 (Act 36). The processor 157 outputs information corresponding to a comparison result (Act 37). For example, if it is detected that the dirt ratio Dr2 is equal to or larger than the threshold T2 (YES in Act 36), the processor 157 outputs information corresponding to a detection result (Act 37). For example, the control panel 133 outputs, based on the output information from the processor 157, information indicating an abnormality with an image or sound. An output method for the information is the same as the output method in the first embodiment. Details of the output method are omitted. If it is detected that the dirt ratio Dr2 is smaller than the threshold T2 (NO in Act 36), the processor 157 transitions to processing in Act 38.

Subsequently, the processor 157 acquires a print amount in a section corresponding to the monitoring section Ms3 for a print amount in each of the divided sections stored in the auxiliary storage device 160. The processor 157 adds the acquired print amount to a present print amount and calculates the integrated print amount Pa3 (YES in Act 38). If it is detected that the print amount added to the present print amount is 0 (NO in Act 38), the processor 157 maintains a value of the integrated print amount Pa3 and ends the processing.

After calculating the integrated print amount Pa3 in the monitoring section linked with the monitoring target unit, the processor 157 acquires the dirt ratio Dr3 corresponding to the integrated print amount Pa3 from the auxiliary storage device 160 (Act 39). The processor 157 compares the dirt ratio Dr3 linked with the monitoring target unit and the threshold T3 (Act 40). The processor 157 outputs information corresponding to a comparison result (Act 41). For example, if it is detected that the dirt ratio Dr3 is equal to or larger than the threshold T3 (YES in Act 40), the processor 157 outputs information corresponding to a detection result (Act 41). For example, the control panel 133 outputs, based on the output information from the processor 157, information indicating an abnormality with an image or sound. An output method for the information is the same as the output method in the first embodiment. Details of the output method are omitted. If it is detected that the dirt ratio Dr3 is smaller than the threshold T3 (NO in Act 40), the processor 157 ends the processing.

According to the second embodiment, the following effects are obtained in addition to the effects in the first embodiment. For example, by acquiring monitoring sections in a plurality of monitoring target units and comparing the monitoring sections with a preset threshold, the processor 157 can confirm a monitoring target unit that needs to be immediately cleaned and a monitoring target unit that does not need to be quickly cleaned. It is possible to carry out cleaning at any timing. It is not essential to execute monitoring processing for the plurality of monitoring target units in series. The monitoring processing for the monitoring target units may be executed in parallel.

[Third Embodiment]

A basic configuration of the image forming apparatus 100 in a third embodiment is the same as the basic configuration of the image forming apparatus 100 illustrated in FIGS. 1A, 1B, 2, 3, 4, 5, 6, 7, and 8 in the first embodiment. Therefore, explanation of the basic configuration is omitted. The auxiliary storage device 160 in the third embodiment stores the print amount Pa, a monitoring section Ms4 linked with a monitoring target unit Mu4, an integrated print amount Pa4, a dirt ratio Dr4 corresponding to the integrated print amount Pa4, and a threshold T4. Division of a print region and a monitoring section in a monitoring target unit according to the third embodiment are the same as the division of the print region and the monitoring section in the monitoring target unit illustrated in FIGS. 10 and 11 in the first embodiment. Therefore, explanation of the division of the print region and the monitoring section in the monitoring target unit is omitted.

An overall operation by the image forming apparatus 100 according to the third embodiment and a print amount calculation processing operation by the image forming apparatus 100 according to the third embodiment are the same as the overall operation and the print amount calculation processing operation illustrated in FIGS. 12 and 13 in the first embodiment. Therefore, explanation of the overall operation and the print amount calculation processing operation is omitted.

An information output operation of the image forming apparatus 100 according to the third embodiment is explained below with reference to FIG. 17. Content of processing in the following operation explanation is an example. Various kinds of processing capable of obtaining the same result can be used as appropriate.

Figure 17:
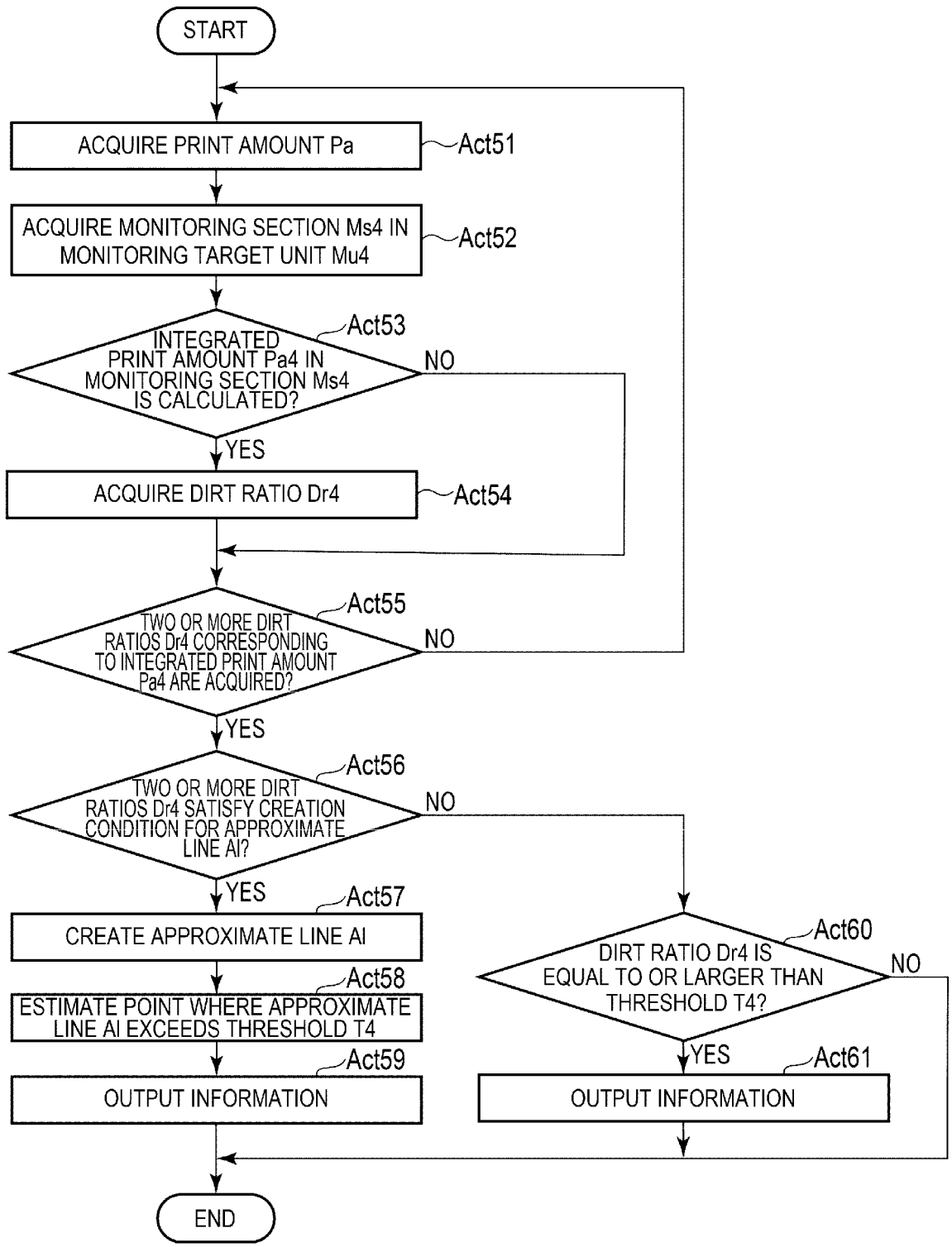
FIG. 17 is a flowchart illustrating an information output processing operation by the image forming apparatus, according to an exemplary embodiment.

FIG. 17 is a flowchart illustrating an information output processing operation by the image forming apparatus 100, according to an exemplary embodiment. That is, FIG. 17 is a flowchart for explaining, in detail, the information output processing in Act 2 illustrated in FIG. 12.

The processor 157 acquires the print amount Pa stored in the auxiliary storage device 160 (Act 51). The processor 157 acquires the monitoring section Ms4 in the monitoring target unit Mu4 from the auxiliary storage device 160 (Act 52).

The processor 157 acquires a print amount in a section corresponding to the monitoring section Ms4 for a print amount in each of the divided sections stored in the auxiliary storage device 160. The processor 157 adds the acquired print amount to a present print amount and calculates the integrated print amount Pa4 (YES in Act 53). If it is detected that the print amount added to the present print amount is 0 (NO in Act 53), the processor 157 maintains a value of the integrated print amount Pa4 and transitions to processing in Act 55.

After calculating the integrated print amount Pa4 in the monitoring section linked with the monitoring target unit, the processor 157 acquires the dirt ratio Dr4 corresponding to the integrated print amount Pa4 from the auxiliary storage device 160 (Act 54). After acquiring two or more values of integrated print amounts Pa4 (YES in Act 55), the processor 157 determines whether the acquired two or more integrated print amounts Pa4 satisfy a generation condition for an approximate line Al (Act 56). For example, if the gradient of the approximate line Al does not exceed the threshold T4 according to the two or more integrated print amounts Pa4, the processor 157 does not generate the approximate line Al.

If it is determined that the acquired two or more integrated print amounts Pa4 satisfy the generation condition for the approximate line Al (YES in Act 56), the processor 157 generates the approximate line Al (Act 57). For example, the approximate line Al generated by the processor 157 may be a linear function or a nonlinear function. After generating the approximate line Al in Act 57, the processor 157 estimates, from the approximate line Al, a point where the approximate line Al exceeds the threshold T4 (Act 58). The point estimated from the approximate line Al by the processor 157 is, for example, the dirt ratio Dr4 corresponding to the integrated print amount Pa4 and is a date and time when the dirt ratio Dr4 is reached. The processor 157 estimates the date and time based on data in the past such as a frequency of use and a number of prints used at a time. An item estimated by the processor 157 is not limited to the date and time. The processor 157 may estimate, for example, a degree of dirt or a deterioration state of image quality.

The processor 157 outputs information estimated in Act 58 (Act 59). For example, the control panel 133 outputs, based on the output information from the processor 157, warning information with an image or sound. An output method for the information is the same as the output method in the first embodiment. Details of the output method are omitted.

If the acquired two or more integrated print amounts Pa4 do not satisfy the generation condition for the approximate line Al (NO in Act 56), the processor 157 compares the dirt ratio Dr4 linked with the monitoring target unit and the threshold T4 (Act 60). The processor 157 outputs information corresponding to a comparison result (Act 61). For example, if it is detected that the dirt ratio Dr4 is equal to or larger than the threshold T4 (YES in Act 60), the processor 157 outputs information corresponding to a detection result (Act 61). For example, the control panel 133 outputs, based on the output information from the processor 157, information indicating an abnormality with an image or sound. An output method for the information is the same as the output method in the first embodiment. Details of the output method are omitted. If it is detected that the dirt ratio Dr4 is smaller than the threshold T4 (NO in Act 60), the processor 157 ends the processing.

According to the third embodiment, the following effects are obtained in addition to the effects in the first embodiment and the second embodiment. The processor 157 estimates an event occurrence from a change amount of an integrated print amount and outputs information concerning the estimated event occurrence. Consequently, it is possible to learn, beforehand, timing when cleaning is necessary. It is possible to generate cleaning scheduling by a serviceperson and carry out cleaning before an image deficiency or image quality deterioration of the image forming apparatus 100 occurs.

[Fourth Embodiment]

A basic configuration of the image forming apparatus 100 in a fourth embodiment is the same as the basic configuration of the image forming apparatus 100 illustrated in FIGS. 1A, 1B, 2, 3, 4, 5, 6, 7, and 8 in the first embodiment. Therefore, explanation of the basic configuration is omitted. The auxiliary storage device 160 in the fourth embodiment stores the print amount Pa.

Figure 18:
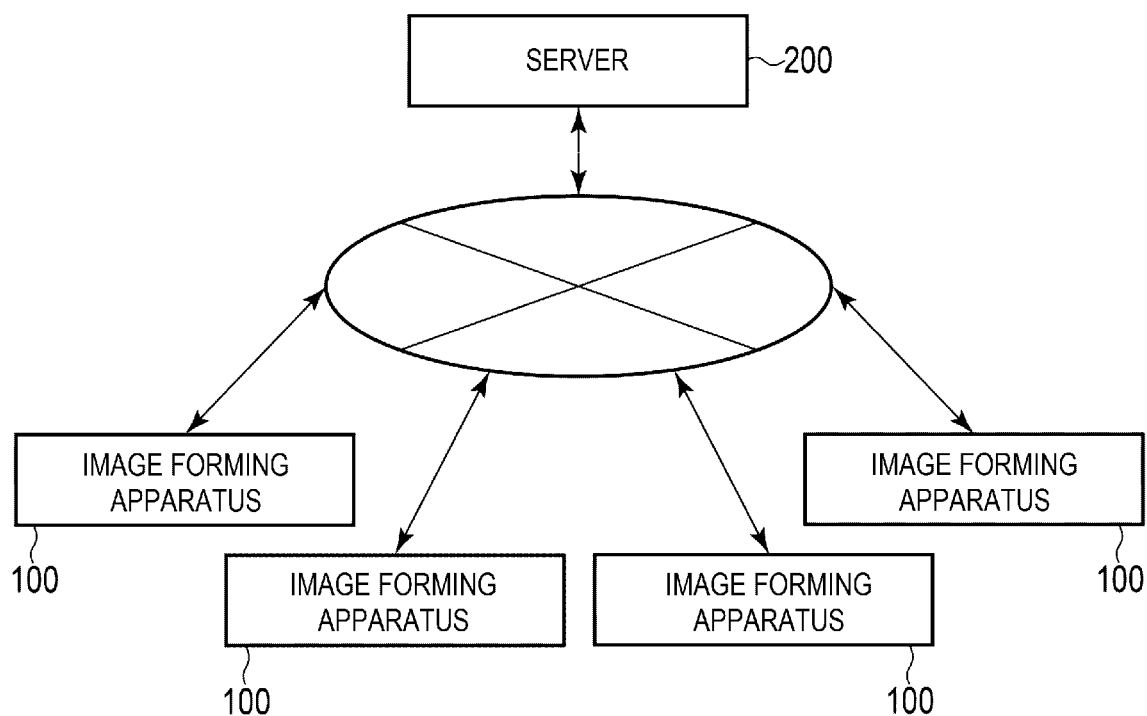
FIG. 18 is a schematic diagram of a mutual communication system in the image forming apparatus and a server, according to exemplary embodiments.

FIG. 18 is a schematic diagram of a mutual communication system in the image forming apparatus 100 and a server 200, according to exemplary embodiments. The mutual communication system includes a plurality of image forming apparatuses 100 and the server 200. The image forming apparatus 100 can be communicably connected to the other image forming apparatuses 100 and the server 200 via a network. In FIG. 18, four image forming apparatuses 100 are illustrated. However, the number of image forming apparatuses 100 is not limited to four and may include more than or less than four image forming apparatuses 100.

Figure 19:
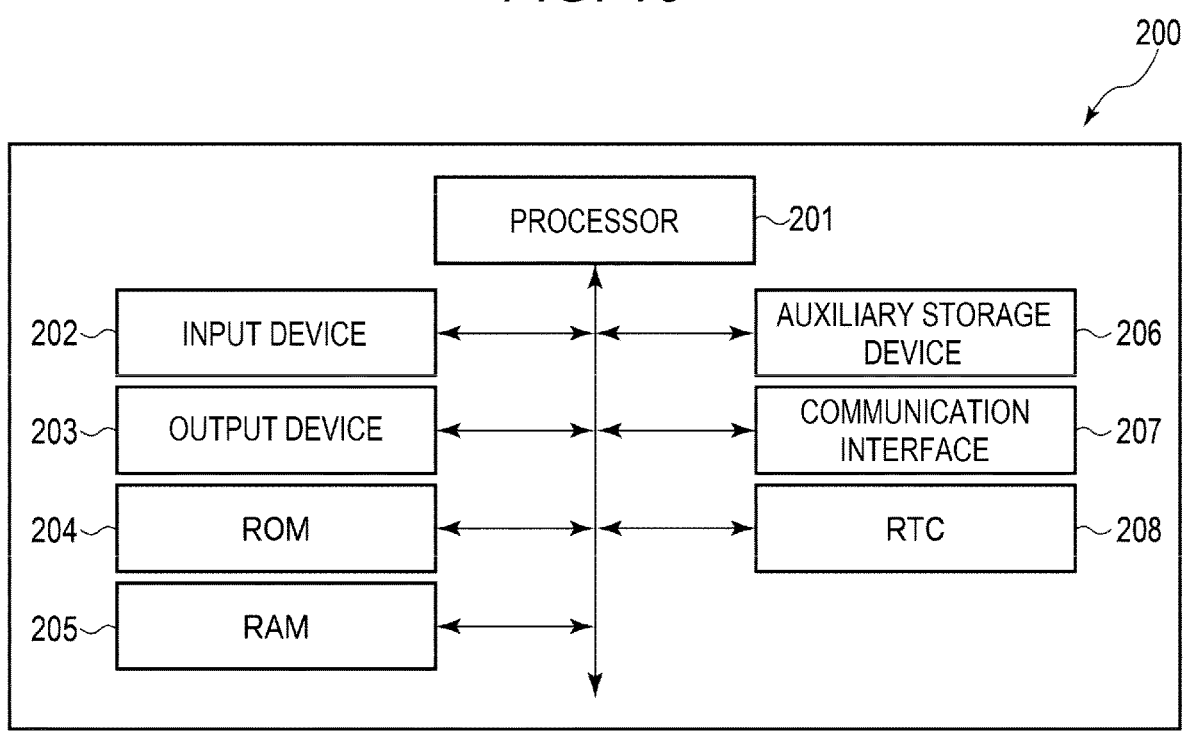
FIG. 19 is a block diagram illustrating a circuit configuration of the server, according to an exemplary embodiment.

An example of a circuit configuration of the server 200 is explained with reference to FIG. 19. FIG. 19 is a block diagram illustrating a circuit configuration of the server 200, according to an exemplary embodiment.

The server 200 includes, as an example, a processor 201, an input device 202, an output device 203, a ROM (read-only memory) 204, a RAM (random-access memory) 205, an auxiliary storage device 206, a communication interface 207, and an RTC (real-time clock) 208.

The processor 201 is equivalent to a central part of a computer that performs processing such as computation and control necessary for operation of the server 200. The processor 201 controls the monitoring sections based on a program such as system software, application software, or firmware stored in the ROM 204, the auxiliary storage device 206, or the like in order to realize various functions of the server 200. The processor 201 is, for example, a CPU (central processing unit), an MPU (micro processing unit), an SoC (system on a chip), a DSP (digital signal processor), a GPU (graphics processing unit), an ASIC (application specific integrated circuit), a PLD (programmable logic device), or an FPGA (field-programmable gate array). Alternatively, the processor 201 is a combination of a plurality of devices among these devices.

The input device 202 is, for example, a device that receives sound data from a microphone or the like or a device that recognizes, with an input detection sheet adopting an electrostatic scheme or a pressure scheme, character data input by an administrator who manages the server 200.

The output device 203 is a display device using liquid crystal, organic EL, or the like. The output device 203 displays sound, characters, an image, or the like corresponding to a signal input from the input device 202.

The ROM 204 is a non-transitory computer-readable storage medium and is equivalent to a main storage device of the computer including the processor 201 as the central part. The ROM 204 is a nonvolatile memory exclusively used for reading out data. The ROM 204 stores data, various setting values, or the like used by the processor 201 in performing various kinds of processing.

The RAM 205 is equivalent to the main storage device of the computer including the processor 201 as the central part. The RAM 205 is a memory used for reading and writing data. The RAM 205 is used as a so-called work area or the like where the processor 201 temporarily stores data in performing the various kinds of processing.

The auxiliary storage device 206 is a non-transitory computer-readable storage medium and is equivalent to an auxiliary storage device of the computer including the processor 201 as the central part. The auxiliary storage device 206 is, for example, an EEPROM™ (electric erasable programmable read-only memory), an HDD (hard disk drive), or an SSD (solid state drive). The auxiliary storage device 206 saves data used by the processor 201 in performing the various kinds of processing, data generated by the processing in the processor 201, various setting values, or the like. The server 200 may include, instead of or in addition to the auxiliary storage device 206, an interface into which a storage medium such as a removable optical disk, a memory card, or a USB memory can be inserted. The auxiliary storage device 206 is a memory that stores various kinds of information.

Programs stored in the ROM 204 or the auxiliary storage device 206 include a program for executing processing explained below. As an example, the server 200 is transferred to an administrator or the like of the server 200 in a state in which the program is stored in the ROM 204 or the auxiliary storage device 206. However, the server 200 may be transferred to the administrator or the like in a state in which the program is not stored in the ROM 204 or the auxiliary storage device 206. The program for executing the processing explained below may be separately transferred to the administrator or the like and written in the ROM 204 or the auxiliary storage device 206 under operation by the administrator or a serviceperson. The transfer of the program at this time can be realized, for example, by recording the program in a removable storage medium such as a magnetic disk, a magneto-optical disk, an optical disk, or a semiconductor memory or by download via a network or the like.

The communication interface 207 is an interface for the server 200 to communicate with the image forming apparatus 100 via a network or the like.

The RTC 208 is a timepiece, a circuit incorporating a timepiece function, or the like.

Division of a print region and a monitoring section in a monitoring target unit according to the fourth embodiment are the same as the division of the print region and the monitoring section in the monitoring target unit illustrated in FIGS. 10 and 11 in the first embodiment. Therefore, explanation of the division of the print region and the monitoring section in the monitoring target unit is omitted.

An overall operation by the image forming apparatus 100 according to the fourth embodiment and a print amount calculation processing operation by the image forming apparatus 100 according to the fourth embodiment are the same as the overall operation and the print amount calculation processing operation illustrated in FIGS. 12 and 13 in the first embodiment. Therefore, explanation of the overall operation and the print amount calculation processing operation is omitted.

An information output operation of the image forming apparatus 100 according to the fourth embodiment is explained below with reference to FIG. 20. Content of processing in the following operation explanation is an example. Various kinds of processing capable of obtaining the same result can be used as appropriate.

Figure 20:
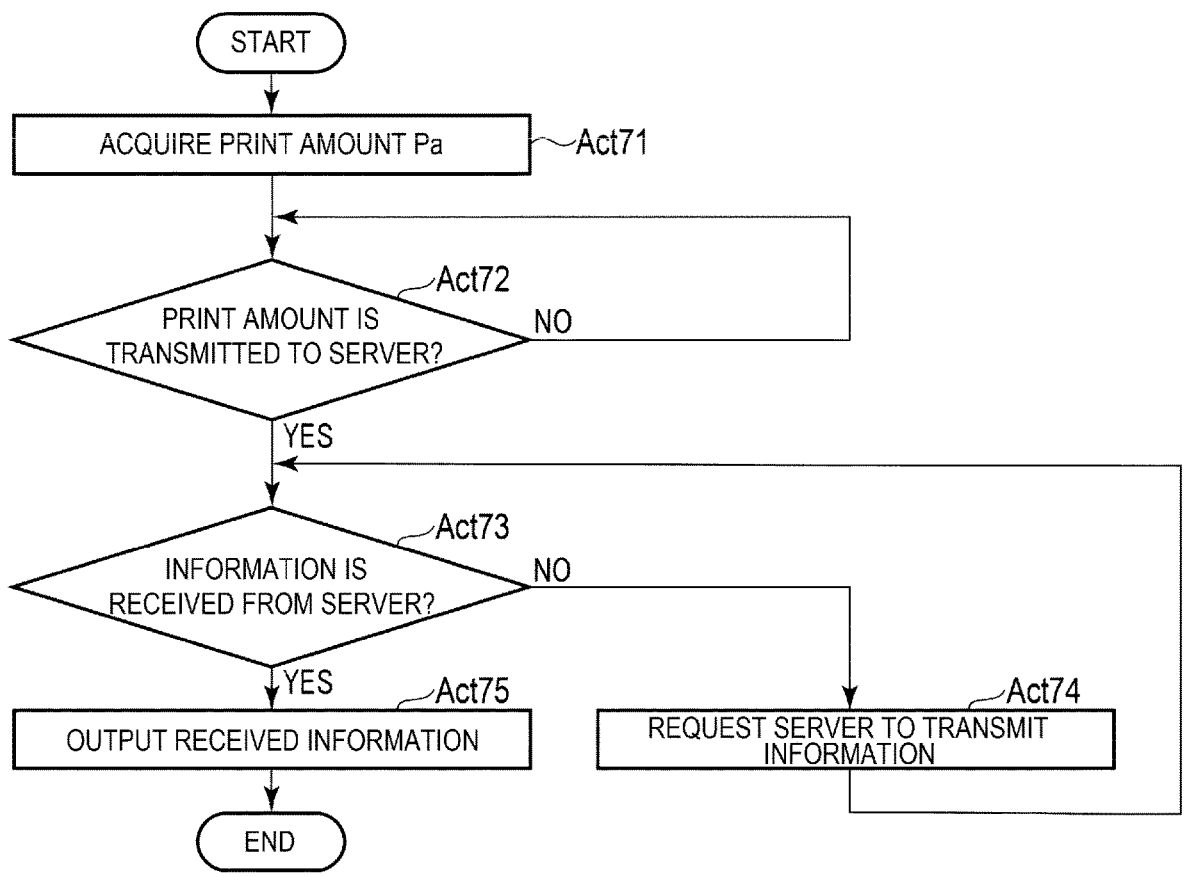
FIG. 20 is a flowchart illustrating an information output processing operation by the image forming apparatus, according to exemplary embodiments.

FIG. 20 is a flowchart illustrating an information output processing operation by the image forming apparatus 100, according to exemplary embodiments. That is, FIG. 20 is a flowchart for explaining, in detail, the information output processing in Act 2 illustrated in FIG. 12.

The processor 157 (the information output processing section 164) acquires the print amount Pa stored in the auxiliary storage device 160 (Act 71). The communication interface 161 transmits the print amount Pa to the server 200 and outputs information received from the server 200. Alternatively, the processor 157 (the information output processing section 164) acquires a print ratio and a number of prints stored in the auxiliary storage device 160. The communication interface 161 transmits the print ratio and the number of prints to the server 200 and outputs information received from the server 200.

The communication interface 161 transmits the acquired print amount Pa to the server 200 (Act 72). If the communication interface 161 transmits the print amount Pa to the server 200 (YES in Act 72), the communication interface 161 stands by for reception of information from the server 200. Alternatively, the communication interface 161 transmits the acquired print ratio and the acquired number of prints to the server 200.

For example, a serviceperson, a user, or the like can optionally set a frequency of the image forming apparatus 100 transmitting information to the server 200 via the communication interface 161. It is also possible to set the image forming apparatus 100 to transmit information on a designated date or a determined number of times in one day.

The communication interface 207 receives the print amount Pa transmitted from the image forming apparatus 100. The auxiliary storage device 206 stores the print amount Pa. The processor 201 acquires the print amount Pa and the like stored in the auxiliary storage device 206. The processor 201 analyzes the print amount Pa and outputs an analysis result. Alternatively, the communication interface 207 receives the print ratio and the number of prints transmitted from the image forming apparatus 100. The auxiliary storage device 206 stores the print ratio and the number of prints. The processor 201 acquires the print ratio, the number of prints, and the like stored in the auxiliary storage device 206. The processor 201 detects the print amount Pa from the print ratio and the number of prints, analyzes the print amount Pa, and outputs an analysis result.

For example, the processor 201 adds the acquired print amount or the detected print amount to a present print amount and calculates the integrated print amount Pa1. After calculating the integrated print amount Pa1 in the monitoring section linked with the monitoring target unit, the processor 201 acquires the dirt ratio Dr1 corresponding to the integrated print amount Pa1 from the auxiliary storage device 206. The processor 201 compares the dirt ratio Dr1 linked with the monitoring target unit and the threshold T1 and, if it is detected that the dirt ratio Dr1 is equal to or larger than the threshold T1, outputs information corresponding to a detection result as an analysis result. Alternatively, the processor 201 may output the dirt ratio Dr1 as the analysis result.

The communication interface 161 receives the analysis result transmitted from the server 200 (YES in Act 73). The processor 157 releases a standby state based on the reception of the analysis result. If the analysis result is not received in the standby state (NO in Act 73), the processor 157 periodically requests the server 200 to transmit information (Act 74). The transmission request for information may be executed if the communication interface 161 fails in the reception or may be executed if the communication interface 207 fails in the transmission.

The processor 157 outputs information corresponding to the received analysis result (Act 75). For example, the control panel 133 outputs, based on the output information from the processor 157, warning information with an image or sound. Alternatively, the control panel 133 may output, based on the output information from the processor 157, information indicating the dirt ratio Dr1. An output method for the information is the same as the output method in the first embodiment. Details of the output method are omitted.

In the above explanation, the server 200 transmits the analysis result to the image forming apparatus 100. However, the server 200 may transmit the analysis result to a communication terminal given to the serviceperson or the like. The communication terminal receives and outputs the analysis result. The serviceperson can confirm the analysis result via the communication terminal and cope with cleaning or the like of the monitoring target unit according to necessity.

According to the fourth embodiment, the following effects are obtained in addition to the effects in the first embodiment, the second embodiment, and the third embodiment. By transmitting the print amount or the print ratio and the number of prints corresponding to the monitoring section in the monitoring target unit, the image forming apparatus 100 can receive the information concerning the dirt ratio corresponding to the integrated print amount in the monitoring target unit and output the received information. The server 200 compares the print amount and the threshold linked with the monitoring target unit stored in advance and determines the output of the information corresponding to the comparison result. Therefore, a load on the image forming apparatus 100 is reduced. By collectively managing the print amount transmitted from the image forming apparatus 100, the monitoring section corresponding to the monitoring target unit, the integrated print amount, the dirt ratio, the threshold, and the like, the server 200 can refer to data in the past of the same machine body or data in the past of the same model and estimate a dirt ratio corresponding to the state of use or the structure of the machine body. Since the server 200 manages the information, the information is speedily expanded to the serviceperson.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus comprising:
an electrophotographic process assembly configured to transfer a toner image formed on a photoconductive body rotating around an axis extending in a main scanning direction onto a sheet conveyed in a sub-scanning direction orthogonal to the main scanning direction; and
a processor and a memory, configured to
store a print amount in a plurality of divided sections corresponding to the main scanning direction,
acquire the print amount from a monitoring section in one or more monitoring target groupings corresponding to a predetermined section included in the plurality of divided sections,
calculate an integrated print amount in the monitoring section, and
output information relating to the monitoring target grouping corresponding to the integrated print amount in the monitoring section.

2. The apparatus according to claim 1, wherein the processor and memory are further configured to store a first monitoring section in a first monitoring target group and a second monitoring section in a second monitoring target group.

3. The apparatus according to claim 2, wherein the first monitoring section corresponds to at least two of the plurality of divided sections.

4. The apparatus according to claim 1, further comprising a user interface configured to output information indicating a dirt ratio corresponding to the print amount.

5. The apparatus according to claim 1, wherein the processor calculates the integrated print amount in the monitoring section from a print ratio and a number of prints in the monitoring section.

6. The apparatus according to claim 1, wherein the processor outputs information concerning the monitoring target group based on a comparison result of a dirt ratio corresponding to the integrated print amount and a threshold.

7. The apparatus according to claim 2, wherein the processor outputs:
first information concerning the first monitoring target group based on a comparison result of a first dirt ratio corresponding to a first print amount in the first monitoring section in the first monitoring target group and a first threshold, and
second information concerning the second monitoring target group based on a comparison result of a second dirt ratio corresponding to a second print amount in the second monitoring section in the second monitoring target group and a second threshold.

8. The apparatus according to claim 1, wherein the processor outputs information concerning an event occurrence estimated from a change amount of a dirt ratio corresponding to the integrated print amount.

9. The apparatus according to claim 1, further comprising a communication interface configured to transmit a print ratio and a number of prints in the monitoring section to a server.

10. The apparatus according to claim 9, further comprising a user interface configured to output information indicating a dirt ratio corresponding to the integrated print amount, wherein
the communication interface is configured to receive, from the server, information indicating the dirt ratio corresponding to the integrated print amount calculated from the print ratio and the number of prints.

11. A method for forming an image using an image forming apparatus having a processor and memory, the method comprising:
forming a toner image on a photoconductive body rotating around an axis extending in a main direction;
transferring the toner image from the photoconductive body onto a sheet being conveyed in a sub-scanning direction orthogonal to the main scanning direction;
storing a print amount in a plurality of divided sections corresponding to the main scanning direction;
acquiring the print amount from a monitoring section in one or more monitoring target groupings corresponding to a predetermined section included in the plurality of divided sections;
calculating an integrated print amount in the monitoring section; and outputting information relating to the monitoring target grouping corresponding to the integrated print amount in the monitoring section.

12. The method according to claim 11, further comprising:

storing a first monitoring section in a first monitoring target group and a second monitoring section in a second monitoring target group, the first monitoring section corresponding to at least two of the plurality of divided sections.

13. The method according to claim 11, further comprising:

outputting information, via a user interface, indicating a dirt ratio corresponding to the print amount.

14. The method according to claim 11, wherein calculating the integrated print amount in the monitoring section further comprises calculating the integrated print amount in the monitoring section from a print ratio and a number of prints in the monitoring section.

15. The method according to claim 11, wherein outputting information relating to the monitoring target grouping further comprises outputting information concerning the monitoring target group based on a comparison result of a dirt ratio corresponding to the integrated print amount and a threshold.

16. The method according to claim 11, wherein outputting information further comprises:

outputting first information concerning the first monitoring target group based on a comparison result of a first dirt ratio corresponding to a first print amount in the first monitoring section in the first monitoring target group and a first threshold; and outputting second information concerning the second monitoring target group based on a comparison result of a second dirt ratio corresponding to a second print amount in the second monitoring section in the second monitoring target group and a second threshold.

17. The method according to claim 11, wherein outputting information further comprises outputting information concerning an event occurrence estimated from a change amount of a dirt ratio corresponding to the integrated print amount.

18. The method according to claim 11, further comprising:

transmitting, via a communication interface, a print ratio and a number of prints in the monitoring section to a server.

19. The method according to claim 18, further comprising:

outputting, via a user interface, information indicating a dirt ratio corresponding to the integrated print amount; and receiving, via the communication interface, information from the server indicating the dirt ratio corresponding to the integrated print amount calculated from the print ratio and the number of prints.

* * * * *